US005802439A

United States Patent [19]

Bennett et al.

[11] Patent Number: 5,802,439

[45] Date of Patent: Sep. 1, 1998

[54] METHOD FOR THE PRODUCTION OF $^{99m}$TC COMPOSITIONS FROM $^{99}$MO-CONTAINING MATERIALS

[75] Inventors: Ralph G. Bennett; Jerry D. Christian; S. Blaine Grover; David A. Petti; William K. Terry; Woo Y. Yoon, all of Idaho Falls, Id.

[73] Assignee: Lockheed Martin Idaho Technologies Company, Idaho Falls, Id.

[21] Appl. No.: 801,982

[22] Filed: Feb. 19, 1997

[51] Int. Cl.$^6$ .............................. C01G 57/00; C01G 39/02

[52] U.S. Cl. .............................. 423/2; 376/186; 376/189; 376/190; 423/59; 976/DIG. 398

[58] Field of Search .............................. 423/2, 59, 49; 376/189, 186, 190; 976/DIG. 398

[56] References Cited

U.S. PATENT DOCUMENTS

| | | |
|---|---|---|
| 3,799,883 | 3/1974 | Hirofumi et al. . |
| 3,833,469 | 9/1974 | Robson . |
| 4,017,583 | 4/1977 | Motojima et al. . |
| 4,123,498 | 10/1978 | Rosenbaum et al. . |
| 4,981,658 | 1/1991 | Ali et al. . |
| 5,382,388 | 1/1995 | Ehrhardt et al. . |

FOREIGN PATENT DOCUMENTS

| | | |
|---|---|---|
| 36752/78 | 4/1981 | Australia . |
| 169575 | 10/1977 | Hungary . |

OTHER PUBLICATIONS

Rösch, F., et al., "Thermochromatographic Separation of $^{94m}$Tc from Enriched Molybdenum Targets and its Large Scale Production for Nuclear Medical Application", *Radiochimica Acta*, 64 (2) :113–120 (1994).

Levin, V., et al., "A Sublimation Generator For $^{99m}$Tc", *Radiochem. Radioanal Letters*, 32 (2) :149 (1979).

Zsinka, L., et al., "New, Portable Generator for the Sublimation of Technetium–99m", International Conference on Radiopharmaceuticals and Labelled Compounds, Toyko, Japan, pp. 95–106 (Oct. 24, 1984).

Bremer, K., "Large–Scale Production and Distribution of Tc–99m Generators for Medical Use", *Radiochimica Acta*, 41:73–81 (1987).

Boyd, R.E., "Technetium–99m Generators—The Available Options", *Int. J. Appl. Radiat. Isot.*, 33:801–809 (1982).

Molinski V. "A Review of $^{99m}$Tc Generator Technology", *Int. J. Appl. Radiat. Isot.*, 33:811–819 (1982).

Boyd, R.E., "Molybdenum–99: Technetium–99m Generator", *Radiochimica Acta*, 30(3): 123–145 (1982).

Colombetti, L., et al., "Study of the Purity of $^{99m}$Tc Sublimed from Fission $^{99}$Mo and the Radiation Dose from the Impurities", *Int. J. Appl. Radiat. Isot.*, 25:35–41 (1974).

(List continued on next page.)

*Primary Examiner*—Ngoclan Mai
*Attorney, Agent, or Firm*—Klaas Law O'Meara & Malkin

[57] ABSTRACT

An improved method for producing $^{99m}$Tc compositions from $^{99}$Mo compounds. $^{100}$Mo metal or $^{100}MoO_3$ is irradiated with photons in a particle (electron) accelerator to ultimately produce $^{99}MoO_3$. This composition is then heated in a reaction chamber to form a pool of molten $^{99}MoO_3$ with an optimum depth of 0.5–5 mm. A gaseous mixture thereafter evolves from the molten $^{99}MoO_3$ which contains vaporized $^{99}MoO_3$, vaporized $^{99m}TcO_3$, and vaporized $^{99m}TcO_2$. This mixture is then combined with an oxidizing gas ($O_{2(g)}$) to generate a gaseous stream containing vaporized $^{99m}Tc_2O_7$ and vaporized $^{99}MoO_3$. Next, the gaseous stream is cooled in a primary condensation stage in the reaction chamber to remove vaporized $^{99}MoO_3$. Cooling is undertaken at a specially-controlled rate to achieve maximum separation efficiency. The gaseous stream is then cooled in a sequential secondary condensation stage to convert vaporized $^{99m}Tc_2O_7$ into a condensed $^{99m}$Tc-containing reaction product which is collected.

29 Claims, 1 Drawing Sheet

OTHER PUBLICATIONS

Tachimori, S., et al., "Diffusion of Tc–99m in Neutron Irradiated Molybdenum Trioxide and Its Application to Separation", *Journal of Nuclear Science and Technology*, 8 (6) :295–301 (Jun. 1971).

Zsinka, L., "$^{99m}$Tc Sublimation Generators", *Radiochimica Acta*, 41:91–96 (1987).

Zsinka, L., et al., "Recent Development in the Sublimation Generator of $^{99}$Tc$^{m}$", *Journal of Labelled Compounds and Radiopharmaceuticals*, 19 (11–12) :1573–1574 (1982).

Rusek, V., et al., "Thermal Separation of $^{99m}$Tc from Molybdenum Trioxide. I. Separation of $^{99m}$", from Molybdenum Trioxide at Temperatures Below 650 °C , *Radiochem. Radioanal. Letters*, 20 (1) 15:–22 (1974).

Vlcek, J., et al., "Thermal Separation of $^{99m}$Tc from Molybdenum Trioxide. II. Separation of $^{99m}$Tc from Molybdenum Trioxide at Temperatures Above 650 °C ", *Radiochem. Radioanal. Letters*, 20 (1) 23–31 (1974).

Machan, V., et al., "Thermal Separation of $^{99m}$Tc from Molybdenum Trioxide. III. Diffusion Separation of $^{99m}$Tc from Molybdenum Trioxide from the Standpoint of Its Possible Use in Technetium Generator", *Radiochem. Radionanal. Letters*, 20 (1) : 33–40 (1974).

Vlcek, J., et al., "Thermal Separation of $^{99m}$Tc from Molybdenum Trioxide. IV. Diffusion of $^{99m}$Tc from Molybdenum Trioxide: Application for Greater Amounts of $MoO_3$", *Radiochem. Radioanal. Letters*, 25 (3) : 173–178 (1976).

Rusek, V., et al., "Thermal Separation of $^{99m}$Tc from Molybdenum Trioxide. V. Thermal Separation of $^{99m}$Tc from Molybdenum Trioxide Using a Carrier–Gas", *Radiochem. Radioanal. Letters*, 25 (3) :179–186 (1976).

Davydov, M., et al., "Preparation of $^{99}$Mo and $^{99m}$Tc in Electron Accelerators", Translated from *Radiokhimiya*, 35 (5) :91–96 (Sept.–Oct. 1993).

Saha, G. B., *Fundamentals of Nuclear Pharmacy*, Third Ed., New York, pp. 65–79 Springer–Verlag (1992).

Helus, F., et al., "System for Routine Production of $^{99m}$Tc by Thermal Separation Technique", *J. Radiolabelled Compounds and Radiopharamaceuticals*, 13 (2) :190 (1977).

Hupf, H., et al., "Sublimation as a Separation System for Radionuclide Generators: Mo–99–Tc–99m, A Working Example", *Southern Med. J.*, 64 (11) :1432 (Nov. 1971).

Toren, D., et al., "Automatic Production of $^{99m}$Tc for Pharmaceutical Use", *J. Nuc. Med.*, 11 (6) :368–369 (1970).

METHOD FOR THE PRODUCTION OF $^{99m}$TC COMPOSITIONS FROM $^{99}$MO-CONTAINING MATERIALS

CONTRACTUAL ORIGIN OF THE INVENTION

The United States Government has rights in this invention pursuant to contract number DE-AC07-94ID13223 between the U.S. Department of Energy and Lockheed Martin Idaho Technologies Company.

BACKGROUND OF THE INVENTION

The present invention generally relates to the production of $^{99m}$Tc and related compositions, and more particularly to the production of $^{99m}$Tc compositions from $^{99}$Mo-containing compounds using a multi-stage vapor separation system.

$^{99m}$Tc compositions (which shall collectively include both elemental $^{99m}$Tc and $^{99m}$Tc-containing compounds) are currently being used in 80–90% of all nuclear medical imaging procedures in the United States. These procedures are employed for many different purposes including cancer detection. At the present time, more than 10 million $^{99m}$Tc scans are conducted in the United States per year. Likewise, the use of $^{99m}$Tc compositions for medical imaging purposes has steadily increased over the past twenty years. From a commercial standpoint, there are over two dozen $^{99m}$Tc-based drug products which have been approved by the U.S. Food and Drug Administration (hereinafter "FDA"). These compositions are used to analyze the following tissue materials: bone, liver, lung, brain, heart, kidney, and other organs as discussed in Wagner, H. et al., "The Present and Future of $^{99m}$Tc", pp. 161–164, in E. Deutsch, ed., *Technetium in Chemistry and Nuclear Medicine*, Cortina Int'l, Verona (1983). Likewise, $^{99m}$Tc compositions have continued to make steady inroads on established radioisotope products including $^{201}$Tl for cardiac analysis and $^{75}$Se for brain, liver and kidney imaging. It is therefore anticipated that the demand for $^{99m}$Tc medical products will grow steadily (e.g. by at least about 5% per year) over the next decade or more.

$^{99m}$Tc compositions have many beneficial characteristics when used in nuclear imaging processes. These characteristics are discussed in numerous references, including Saha, G. B., *Fundamentals of Nuclear Pharmacy*, Third Ed., New York, pp. 65–79, Springer-Verlag (1992). For example, $^{99m}$Tc has a six-hour half-life which is important from a safety and compatibility perspective when human subjects are involved. Furthermore, $^{99m}$Tc emits a substantial amount of 141 keV gamma radiation with very little particulate emission (e.g. in the form of conversion electrons). This gamma energy level is useful since it can exit the human body from deep organs (e.g. the heart), yet is not too high to collimate effectively in modern gamma camera units. In addition, the $^{99}$Mo parent of $^{99m}$Tc has a half-life which is about ten times that of $^{99m}$Tc. This relationship facilitates the development of a radionuclide generator that produces high yields of easily-separated $^{99m}$Tc compositions.

$^{99m}$Tc compositions are also useful in many chemically-induced radiolabelling reactions, including the formation of chelates from reduced technetium or from ligand exchange processes. Accordingly, $^{99m}$Tc compositions have many different characteristics which are of considerable value in medical imaging applications. As a final point of background information, the "m" in $^{99m}$Tc signifies the metastable excited state of the technetium isotope whose atomic weight is 99. This metastable state has the aforementioned half life of six hours, and is a medically useful radioisotope of technetium. This is distinct from the ground state of the same isotope $^{99}$Tc which has no medical usefulness. $^{99}$Tc is also radioactive but has a half life of about 213,000 years. The metastable state decays into the ground state, so $^{99}$Tc is always present to some degree in $^{99m}$Tc compositions, and increases with time. The two isomeric states of the same nucleus are impossible to distinguish chemically, and the $^{99}$Tc effectively competes with the $^{99m}$Tc in all known radiolabelling reactions. Thus, as a practical matter, suppliers of $^{99m}$Tc compositions always need to address how they will keep the amount of $^{99}$Tc contamination within acceptable levels through prompt handling and distribution. Since $^{99m}$Tc compositions are the desired materials to be isolated in this case, the "m" designation will be used herein for the sake of clarity and convenience with respect to all of the intermediate and final Tc compositions that are produced in accordance with the claimed process.

Many different methods have been used to produce $^{99m}$Tc compositions in the past. To manufacture a desired $^{99m}$Tc product, two basic processing steps are of importance. First, a suitable method must be employed to generate the "parent" nuclide (e.g. $^{99}$Mo), followed by a method for separating the $^{99m}$Tc "daughter" from its parent. The first demonstration of a $^{99}$Mo/$^{99m}$Tc generator occurred in 1957 which involved the activation of $^{99}$Mo from either natural molybdenum or enriched $^{98}$Mo in accordance with the following reaction:

$$^{98}\text{Mo}\ (n,\gamma)^{99}\text{Mo} \quad (1)$$

The $^{99}$Mo produced using this approach (which is characterized as "activation moly") is generally limited to a low specific activity level of about 2 Ci/g which is unacceptable in connection with many radiolabelling reactions currently of interest. Virtually all of the $^{99m}$Tc manufactured during the 1960s and 1970s involved the activation of $^{99}$Mo from either natural molybdenum or enriched $^{98}$Mo as described above.

In 1974, new generator technology was developed as described in U.S. Pat. No. 3,799,883 which enabled the production of "fission moly" using the following reaction:

$$^{235}\text{U}\ (n,\ \text{fission})^{99}\text{Mo} \quad (2)$$

This process is the most commonly used method for producing $^{99}$Mo today. The production of "fission moly" as described above generates $^{99}$Mo fission products with a specific activity above 3000 Ci/g. While a high specific activity product is generated using this approach, the entire production system is expensive, complex, and requires substantial amounts of advanced equipment to achieve a high-purity product. In addition, the generation of "fission moly" necessitates the use of high enriched uranium (hereinafter "HEU") as a starting material. High enriched uranium is expensive and presents numerous handling/safety problems. Finally, this process generates substantial amounts of hazardous, long-term nuclear wastes (e.g. $^{236}$U, $^{239}$PU, $^{90}$Sr, $^{85}$Kr, $^{137}$Cs, $^{134}$Cs, and $^{237}$Np) which likewise create disposal problems.

A method investigated in the 1970s for producing the $^{99}$Mo parent involved the use of cyclotron technology. As indicated in Helus, F. et al., "System for Routine Production of $^{99m}$Tc by Thermal Separation Technique", *J. Radiolabelled Compounds and Radiopharmaceuticals*, 13(2):190 (1977), $^{99}$Mo was produced using cyclotron technology in accordance with the following reaction:

$$^{100}\text{Mo}\ (p,d)^{99}\text{Mo} \quad (3)$$

However, this approach generated various side reactions which adversely affected product purity levels.

Current research activities have involved the use of electron linear accelerator technology to generate high energy "bremsstrahlung" (e.g. photoneutrons or "photons") for $^{99}$Mo production. The following nuclear reactions are involved in this process (wherein $Et_r$=the reaction threshold):

$$^{100}Mo(\gamma,n)^{99}Mo\ (E_t=9.1\ MeV) \quad (4)$$

$$^{100}Mo(\gamma,p)^{99}Nb\ (T_{1/2}=15\ sec.)\rightarrow^{99}Mo\ (E_t=16.5\ MeV) \quad (5)$$

$$^{100}Mo(\gamma,p)^{99m}Nb\ (T_{1/2}=2.6\ min.)\rightarrow^{99}Mo\ (E_t=16.9\ MeV) \quad (6)$$

$$^{100}Mo(n,2n)^{99}Mo\ (E_t=8.3\ MeV) \quad (7)$$

$$^{98}Mo(n,\gamma)^{99}Mo \quad (8)$$

Additional information regarding these reactions and the basic processes for generating $^{99}$Mo using accelerator technology is disclosed in Davydov, M., et al., "Preparation of $^{99}$Mo and $^{99m}$Tc in Electron Accelerators", *Radiokhimiya*, 35(5):91–96 (September–October 1993) which is incorporated herein by reference. While Davydov et al. presents the details of accelerator-produced $^{99}$Mo, it does not describe methods or procedures for separating the $^{99}$Mo parent from its $^{99m}$Tc daughter as discussed below which is an important and unique aspect of the present invention.

With continued reference to the foregoing process, the photons or bremsstrahlung will need to exceed the threshold energy for the 8.3 MeV photoneutron reaction listed in equation (4) which involves $^{100}Mo(\gamma,n)^{99}Mo$. Alternatively, bremsstrahlung having energy levels above 10.6 MeV may likewise induce the secondary reactions set forth in equations (5) and (6) which involve $^{100}Mo(\gamma,p)^{99}Nb$ and $^{100}Mo(\gamma,p)^{99m}Nb$. Both of these reactions produce products which beta-decay to $^{99}$Mo very quickly as outlined above. If the bremsstrahlung are at other energy levels (e.g. in the range of 14–20 MeV), they can induce double neutron or proton emission. However, these reactions both produce stable $^{98}$Mo and do not generate significant amounts of impurities.

Accordingly, the use of particle accelerator technology to manufacture $^{99}$Mo provides many benefits compared with conventional reactor systems using high enriched uranium. These benefits include reduced operating costs, improved safety, and the avoidance of long-term nuclear waste generation. However, regardless of which method is used to produce $^{99}$Mo, a need remains for an effective and rapid procedure for separating the desired $^{99m}$Tc daughter compositions from the $^{99}$Mo parent.

In the past, many different methods have been employed to separate $^{99m}$Tc compositions from $^{99}$Mo products. Some of these processes use multi-step chemical procedures which are cost intensive and of limited effectiveness. For example, in situations involving the reactor-based generation of "fission moly" (e.g. using the following reaction: $^{235}U(n,fission)^{99}Mo$), the resulting $^{99}$Mo product is processed using chromatographic techniques to isolate the desired $^{99m}$Tc compositions. Specifically, the fission product is treated using an alumina column in which molybdate ions ($^{99}MoO_4^{-2}$) are tightly bound to the column. Pertechnetate ions ($^{99m}TcO_4^-$) generated from the radioactive decay of the parent compound are not bound and eluted using a saline solution.

Alternative methods for separating and isolating the desired $^{99m}$Tc compositions have also been investigated. For example, a technique known as "sublimation separation" has been employed. This process is discussed in U.S. Pat. No. 3,833,469 and initially involves the production of a low specific activity $^{99}MoO_3$ product using nuclear reactor technology as previously described. The $^{99}MoO_3$ product (which is pulverized to form a powder) is then heated inside a tube furnace to a temperature within a broad range of about 750°–950° C. in order to vaporize and release the desired $^{99m}$Tc compositions. The $^{99m}$Tc compositions are carried through the system using a flowing stream of gas (e.g. $O_{2(g)}$). To completely separate and isolate the desired $^{99m}$Tc compositions, it is necessary to pass the gaseous product through a filter at the end of the system which may be manufactured from numerous compositions including silica wool, nickel, and stainless steel. The filter must be maintained at a temperature of at least 310° C. which is above the boiling point of the vaporized $^{99m}$Tc composition, namely, $^{99m}Tc_2O_7$. The heated filter is specifically designed to trap any residual vaporized $^{99}MoO_3$ compositions which, if not retained, will contaminate the final $^{99m}$Tc product. The gaseous composition which passes through the filter is then treated in an external condenser for recovery of the desired $^{99m}$Tc composition. As noted above, this process is specifically designed for use with low specific activity reactor-produced $^{99}MoO_3$ products. This situation exists because of the ease of irradiating a substantial mass of $^{98}MoO_3$ in a reactor, combined with the fact that oxygen does not form any long-lived activation products under neutron irradiation.

Reactor-based production methods are expensive, labor-intensive, and produce significant amounts of hazardous nuclear waste. Likewise, the method described above requires a heated filter system that increases the complexity of the entire process and reduces recovery efficiency. While the foregoing method can be employed to isolate desired $^{99m}$Tc compositions, tests conducted using this method have rarely produced recovery levels exceeding about 50%. Further information on this technique and related sublimation processes is presented in the following articles: Boyd, R., "Molybdenum-99: Technetium-99m Generator", *Radiochimica Acta*, 30(3):123–145 (1982) and Boyd, R., "Technetium-99m Generators—The Available Options", *Int. J. Appl. Radiat. Iso.*, 33:801–809 (1982).

A considerable amount of related work was conducted in Czechoslovakia in the mid-1970s concerning the use of powdered $^{99}$Mo sample materials combined with $SiO_2$ grit, presumably to increase the transpiration flow within the sample. This work is discussed in the following articles: Rusek V. et al., "Thermal Separation of $^{99m}$Tc from Molybdenum Trioxide; I. Separation of $^{99m}$Tc from Molybdenum Trioxide at Temperatures Below 650° C.", *Radiochem. Radioanal. Letters*, 20(1):15–22 (1974); Vlcek, J., et al., "Thermal Separation of $^{99m}$Tc from Molybdenum Trioxide; II. Separation of $^{99m}$Tc from Molybdenum Trioxide at Temperatures Above 650° C.", *Radiochem. Radioanal. Letters*, 20(1):23–31 (1974); Machan, V., et al., "Thermal Separation of $^{99m}$Tc from Molybdenum Trioxide; III. Diffusion Separation of $^{99m}$Tc from Molybdenum Trioxide from the Standpoint of its Possible Use in Technetium Generator", *Radiochem. Radioanal. Letters*, 20(1):33–40 (1974); Vlcek, V., et al., "Thermal Separation of $^{99m}$Tc from Molybdenum Trioxide; IV. Diffusion of $^{99m}$Tc from Molybdenum Trioxide: Application for Greater Amounts of $MoO_3$", *Radiochem. Radioanal. Letters*, 25(3):173–178 (1976); and Rusek, V. et al., "Thermal Separation of $^{99m}$Tc from Molybdenum Trioxide; V. Thermal Separation of $^{99m}$Tc from Molybdenum Trioxide using a Carrier-Gas", *Radiochem. Radioanal. Letters*, 25(3)179–186 (1976).

Tests conducted in Germany in the late 1970s involved a different approach in which $^{99}$Mo sample materials were completely vaporized at very high temperatures (e.g. 1100° C.) using a specialized multi-oven system. The test samples were transported in an alternating manner between two oven sections in a separation column as discussed in Helus F., et al., "System for Routine Production of $^{99m}$Tc by Thermal Separation Technique", *J. Radiolabelled Compounds and Radiopharmaceuticals*, 13(2):190 (1977).

As described in Hungarian Patent No. 169,575 (dated Jul. 11, 1974) a different approach was adopted in which a sample mixture was prepared by combining $TiO_2$ and $^{99}MoO_3$ to create a specialized combination of ingredients which allegedly produced a greater release of $^{99m}$Tc at lower temperatures. This mixture included a 1:1 ratio of Ti atoms to Mo atoms. However, it appears that the claimed process could only achieve about a 50% recovery rate. Further information regarding the foregoing procedure is discussed in Zsinka, L., et al., "Recent Development in the Sublimation Generator of $^{99m}$Tc", *J. Labelled Comp. and Radiopharmaceuticals*, 19(11–12) :1573–1574 (1982) and in Zsinka, L., "$^{99m}$Tc Sublimation Generators", *Radiochimica Acta*, 41(2/3):91–96 (1987). Additional information concerning other sublimation processes of interest is disclosed in the following supplemental references: Tachimori, S. et al., "Diffusion of $^{99m}$Tc in Neutron Irradiated Molybdenum Trioxide and its Application to Separation", *J. Nuc. Sci. and Tech.*, 8(6):295–301 (June 1971); Hupf, H. et al., "Sublimation as a Separation system for Radionuclide Generators: $^{99}$Mo—$^{99m}$Tc, A Working Example", *Southern Med. J.*, 64(11):1432 (November 1971); and Colombetti, L. et al., "Study of the Purity of $^{99m}$Tc Sublimed from Fission $^{99}$Mo and the Radiation Dose from the Impurities", *Int. J. Appl. Rad. Iso.*, 25:35–41 (1974).

Finally, an alternative, non-sublimation process for isolating $^{99m}$Tc compositions involves solvent extraction using, for example, methyl ethyl ketone. This method (which uses substantial amounts of organic extractants) is further discussed in Boyd, R., "Molybdenum-99: Technetium-99m Generator", *Radiochimica Acta*, 30(3):123–145 (1982); Molinski, V., "A Review of $^{99m}$Tc Generator Technology", *Int. J. Appl. Radiat. Iso.*, 33:811–819 (1982); and Toren, D. et al., "Automatic Production of $^{99m}$Tc for Pharmaceutical Use", *J. Nuc. Med.*, 11(6):368–369 (1970).

Notwithstanding the methods described above, a need remains for a $^{99m}$Tc production method in which the parent nuclide ($^{99}$Mo) is manufactured in a cost-effective and safe manner without the generation of hazardous nuclear wastes, followed by efficient separation of the desired $^{99m}$Tc compositions from the parent with a high recovery level. This need is especially important in view of the increased demand for $^{99m}$Tc compositions as previously noted. With more than ten million $^{99m}$Tc-based scans being conducted annually in the United States at the present time, the current United States market for $^{99m}$Tc compositions is about $100,000,000 per year for deliveries of about 500 Ci per day of $^{99m}$Tc. The present invention satisfies this need in a highly effective manner which overcomes the problems and disadvantages described above. In particular, the claimed method optimizes the recovery process without the need for uranium-generated $^{99}$Mo compositions or supplemental separation systems (e.g. filter units). The claimed invention therefore represents an advance in the art of $^{99m}$Tc recovery which provides the following benefits: (1) the ability to produce substantial $^{99m}$Tc yields without using reactor-based uranium processes; (2) the isolation of $^{99m}$Tc compositions from $^{99}$Mo products in a manner which avoids losses caused by incomplete separation of these materials; (3) generation of the desired $^{99m}$Tc compositions using a procedure which is cost effective, rapid, safe, and avoids the production of hazardous, long-term nuclear wastes; (4) the use of a liquid-based, melt-type system which is characterized by improved product separation efficiency and purity levels compared with sublimation processes; (5) the development of a system which includes controlled, multiple condensation stages to provide a high product purity level with a minimal number of operational steps; (6) the use of a simplified production system that does not require supplemental vapor filtration components; and (7) the ability to manufacture desired $^{99m}$Tc compositions using a minimal amount of equipment. Accordingly, the present invention represents a significant advance in the art of $^{99m}$Tc production. Further information regarding the invention and its capabilities will be provided below.

SUMMARY OF THE INVENTION

It is an object of the present invention to provide a highly effective method for producing and separating $^{99m}$Tc compositions from parent $^{99}$Mo products.

It is another object of the invention to provide an improved method for producing and separating $^{99m}$Tc compositions from $^{99}$Mo products in which the $^{99}$Mo products (consisting of $^{99}MoO_3$) are generated in a manner which avoids the use of nuclear reactor-based fission systems and the corresponding generation of long-term nuclear wastes.

It is another object of the invention to provide an improved method for producing and separating $^{99m}$Tc compositions from $^{99}$Mo products in which the $^{99}$Mo products (consisting of $^{99}MoO_3$) are manufactured using particle (e.g. electron) accelerator technology.

It is another object of the invention to provide an improved method for producing and separating $^{99m}$Tc compositions from $^{99}$Mo products in which a high level of separation efficiency is accomplished using a minimal number of process steps.

It is another object of the invention to provide an improved method for producing and separating $^{99m}$Tc compositions from $^{99}$Mo products in which a high level of separation efficiency is achieved through the use of a single reaction chamber with multiple condensation stages.

It is a further object of the invention to provide an improved method for producing and separating $^{99m}$Tc compositions from $^{99}$Mo products which avoids the use of required supplemental separation systems, including vapor filtration units and the like.

It is a further object of the invention to provide a method for producing and separating $^{99m}$Tc compositions from $^{99}$Mo products in which high-purity final $^{99m}$Tc compositions are generated in substantial quantities.

It is a further object of the invention to provide a method for producing and separating $^{99m}$Tc compositions from $^{99}$Mo products which achieves high purity levels through the initial generation of a molten pool of $^{99}MoO_3$ having a minimal depth which allows the desired $^{99m}$Tc compositions to diffuse therefrom in a more efficient manner compared with conventional sublimation systems.

It is a still further object of the invention to provide a method for producing and separating $^{99m}$Tc compositions from $^{99}$Mo products which involves minimal costs and operating expenses.

It is a still further object of the invention to provide a method for producing and separating $^{99m}$Tc compositions from $^{99}$Mo products which is accomplished in a reaction chamber of minimal complexity using a design that allows precise internal temperature control to be achieved.

It is an even further object of the invention to provide a method for producing and separating $^{99m}$Tc compositions from $^{99}Mo$ products which is capable of rapid, on-demand delivery of the desired $^{99m}Tc$ compositions in a manner which achieves optimum results from a technical, economic, and purity standpoint.

In accordance with the foregoing objects, the present invention involves a unique and highly efficient method for producing, separating, and isolating $^{99m}Tc$ compositions (e.g. $^{99m}Tc$ and/or $^{99m}Tc$-containing compounds) from $^{99}Mo$-containing materials (e.g. $^{99}MoO_3$). The claimed process is characterized by a high level of separation efficiency which enables the production of a desired $^{99m}Tc$ product in a rapid and effective manner. A brief overview of the basic aspects of the claimed invention will now be provided. More specific information, details, definitions, and other factors of importance will be presented in the section entitled "Detailed Description of Preferred Embodiments" set forth below.

In accordance with the claimed process, an initial supply of $^{99}MoO_3$ is first provided. Production of the initial supply of $^{99}MoO_3$ may be accomplished in two different ways, both of which use particle accelerator technology to generate the desired starting materials. The term "particle accelerator technology" will be defined below and basically involves the use of a selected particle (e.g. electron) accelerator system to produce the desired starting materials. Likewise, the term "particle accelerator" may encompass the use of both linear accelerator units as discussed further below and non-linear accelerator systems (e.g. conventional systems known as "racetrack" accelerators). The use of particle accelerator technology for this purpose avoids the need for expensive nuclear reactors and the long-term (e.g. long half-life) nuclear wastes associated therewith. While the use of particle accelerator technology in the claimed process is preferred, unique, and represents a significant development, other processes may also be used to generate the $^{99}Mo$ or $^{99}MoO_3$ starting materials in this invention including cyclotron-type (proton-based) methods. Accordingly, the present invention shall not be limited to any particular methods for generating the required starting materials.

In a preferred embodiment, a particle accelerator apparatus of standard design (optimally an electron-based linear accelerator) is provided which is supplied with a portion of enriched $^{100}Mo$ metal to be used as a target. Best results are achieved within an enrichment range of about 60–100%. The use of enriched $^{100}Mo$ for this purpose will enable the final $^{99m}Tc$ product to be produced in the desired amounts, and will likewise assist in minimizing the generation of impurities. Further information regarding enrichment, the use of enriched $^{100}Mo$ metal, and the benefits it provides will be described below. Thereafter, in a preferred embodiment involving the use of an accelerator apparatus, the apparatus is activated in order to generate high energy photons (e.g. "bremsstrahlung") therein. The $^{100}Mo$ metal is then irradiated with the high energy photons to produce $^{99}Mo$ metal therefrom.

Next, the accelerator-generated $^{99}Mo$ metal is removed from the particle accelerator apparatus. To produce $^{99}MoO_3$ from the $^{99}Mo$ metal, it is dissolved in at least one oxygen-containing solvent (e.g. $HNO_3$, $H_2SO_4$, and $H_2O_2$) to generate a solvated $^{99}Mo$ product therefrom. The solvated $^{99}Mo$ product is thereafter dried to produce a dried $^{99}Mo$ compound which ultimately comprises the initial supply of $^{99}MoO_3$ that is used to thermally generate the desired $^{99m}Tc$ compositions. This method (e.g. the use of $^{100}Mo$ metal) is preferred because the reaction rate of high-energy photons ("bremsstrahlung") during the production of $^{99}Mo$ from $^{100}Mo$ will be considerably higher compared with processes which use $^{100}Mo$ compounds (instead of $^{100}Mo$ metal). Higher reaction rates exist when $^{100}Mo$ metal is used because any other materials which are "compounded" with the initial $^{100}Mo$ will scatter or absorb the photons and reduce the overall reaction rate. This is particularly true when $^{100}MoO_3$ is employed since three oxygen atoms will compete with each atom of $^{100}Mo$ for interaction with the high energy photons. Interaction of the photons with oxygen atoms will generally reduce the energy of a given proportion of the photons over time to an energy level below the 8.3 MeV threshold value for the desired reaction.

Even though $^{100}Mo$ metal is preferred for use as a starting material as discussed above, $^{100}MoO_3$ may nonetheless be employed in an alternative embodiment as a starting composition (e.g. a target) instead of $^{100}Mo$ metal. Again, optimal results will be attained if enriched $^{100}MoO_3$ is used. Best results are achieved within an enrichment range of about 60–100%. Further information regarding enrichment, the use of enriched $^{100}MoO_3$, and the benefits it provides will be described below. Next, a particle accelerator apparatus (e.g. a linear electron accelerator unit) is provided which is supplied with the $^{100}MoO_3$. The accelerator apparatus is subsequently activated in order to generate high energy photons (e.g. "bremsstrahlung") therein. The $^{100}MoO_3$ is then irradiated with the high energy photons from the accelerator apparatus to produce the desired initial supply of $^{99}MoO_3$ from the $^{100}MoO_3$. The initial supply of $^{99}MoO_3$ is thereafter removed from the accelerator apparatus for use in thermally generating the final $^{99m}Tc$ compositions.

Many different reaction chambers and production systems may be employed to isolate the desired $^{99m}Tc$ "daughter" product from the $^{99}Mo$ "parent", with the claimed method not being limited to any specific manufacturing systems. However, in a representative and preferred embodiment, the claimed process will be performed in an elongate tubular reaction chamber having a first end, a second end, a side wall, and a passageway through the reaction chamber from the first end to the second end. To achieve optimum results, the side wall of the reaction chamber will be seamless in order to avoid high temperature seals and eliminate undesired recesses or crevices which may trap the final $^{99m}Tc$ product. The reaction chamber further includes (e.g. is divided into) a heating section beginning at the first end, heating means for applying heat to the heating section, a first cooling section in fluid communication with the heating section, and a second cooling section in fluid communication with the first cooling section. As described below, the second cooling section terminates at the second end of the reaction chamber with the first cooling section being positioned between the heating section and the second cooling section. In a preferred embodiment, the reaction chamber is designed so that the second cooling section is positioned at about a 15°–165° angle (optimally about a 90° angle) relative to the first cooling section. This configuration avoids any undesired heat transfer from the first cooling section to the second cooling section as further discussed below.

In the foregoing embodiment, the passageway through the reaction chamber will further include a $^{99}MoO_3$ containment vessel therein having an open top portion. The containment vessel is specifically positioned within the heating section. The containment vessel is preferably made of platinum or a platinum alloy. However, other construction materials which may be employed for this purpose include a Ni—Cr alloy, stainless steel, or quartz. These materials may be coated with an optional surface layer of platinum or gold if desired as determined by preliminary tests and discussed further below.

The foregoing compositions (especially the platinum materials) are strong, resistant to physical deformation over a wide range of temperatures, and facilitate the heating process associated with the initial supply of $^{99}MoO_3$.

Next, the initial supply of $^{99}MoO_3$ is placed within the heating section in the reaction chamber (e.g. inside the containment vessel). The initial supply of $^{99}MoO_3$ is then heated in the reaction chamber to a temperature of about 800°–900° C. using the heating means. This temperature is sufficient to produce molten $^{99}MoO_3$ from the initial supply of $^{99}MoO_3$. Likewise, the foregoing temperature level will cause a gaseous mixture to evolve from the molten $^{99}MoO_3$ which consists of vaporized $^{99}MoO_3$, vaporized $^{99m}TcO_3$, and vaporized $^{99m}TcO_2$. A small amount of vaporized $^{99m}Tc_2O_7$ may also be produced. However, it is believed that the amount of any vaporized $^{99m}Tc_2O_7$ in the gaseous mixture will be so small that, for the sake of clarity and convenience, the gaseous mixture at this stage will be designated to only include vaporized $^{99m}TcO_3$ and vaporized $^{99m}TcO_2$. In accordance with a preferred embodiment of the present invention, the heating process will specifically involve the step of forming the molten $^{99}MoO_3$ into a pool. This may be accomplished in many ways within the reaction chamber, with the present invention not being limited to any particular pool-forming technique. However, pool formation may be accomplished using the above-described containment vessel which is positioned within the passageway (e.g. the heating section) inside the reaction chamber. Prior to heating, the initial supply of $^{99}MoO_3$ is placed inside the containment vessel. Thereafter, heating of the $^{99}MoO_3$ is undertaken within the containment vessel, with the molten $^{99}MoO_3$ forming a pool inside the vessel. In a preferred embodiment, optimum yields and purity levels will be achieved if the pool of molten $^{99}MoO_3$ has a uniform depth of about 0.5–5 mm. This particular depth will allow the gaseous mixture to diffuse through and evolve from the molten $^{99}MoO_3$ in a rapid, efficient, and complete manner. In this regard, the foregoing depth range represents a unique aspect of the claimed process which contributes to its efficiency.

A supply of oxygen-containing oxidizing gas is then provided which is preferably pre-heated to a temperature of about 700°–900° C. prior to entry into the reaction chamber. Representative oxygen-containing gases include but are not imited to $O_{2(g)}$, air, $O_{3(g)}$, $H_2O_{2(g)}$, or $NO_{2(g)}$, with $O_{2(g)}$ providing best results. Many different methods may be employed to heat the gas, including the use of an external heating unit or a gas delivery unit which is positioned adjacent the reaction chamber so that counter-current heating may be achieved as discussed below. The supply of oxidizing gas (after pre-heating) is then introduced into the reaction chamber and passed over the pool of molten $^{99}MoO_3$ at a flow rate of about 10–100 std. cc/min during evolution of the gaseous mixture from the molten $^{99}MoO_3$. Passage of the oxidizing gas over the molten $^{99}MoO_3$ in this manner forms a gaseous stream consisting of the oxidizing gas in combination with the gaseous mixture. At this stage, the oxidizing gas oxidizes the vaporized $^{99m}TcO_3$ and vaporized $^{99m}TcO_2$ in the gaseous mixture to form a supply of vaporized $^{99m}Tc_2O_7$ from these components. As a result, the gaseous stream will contain vaporized $^{99m}Tc_2O_7$, vaporized $^{99}MoO_3$, and remaining (unreacted) amounts of the oxidizing gas after oxidation of the vaporized $^{99m}TcO_3$ and vaporized $^{99m}TcO_2$. The gaseous stream then passes through the heating section and enters the first cooling section of the reaction chamber.

Next, the gaseous stream is cooled within the first cooling section of the reaction chamber which functions as a primary condensation stage in the claimed process. In a preferred embodiment, the gaseous stream is cooled from an initial temperature of about 800°–900° C. when the gaseous stream enters the first cooling section to a final temperature of about 300°–400° C. when it exits the first cooling section. This process enables the condensation and removal of the vaporized $^{99}MoO_3$ from the gaseous stream while allowing the vaporized $^{99m}Tc_2O_7$ in the stream to remain unaffected. To achieve optimum separation efficiency and create a highly pure $^{99m}Tc$ final product with minimal amounts of residual $^{99}Mo$ therein, the first cooling section of the reaction chamber will have a length sufficient to achieve a gradual and a controlled temperature decrease (e.g. cooling rate) from the initial temperature to the final temperature of about 5°–50° C./cm. After cooling of the gaseous stream in the primary condensation stage of the claimed process, the gaseous stream will include vaporized $^{99m}Tc_2O_7$ and remaining (unreacted) amounts of the oxidizing gas (with only negligible quantities of residual $^{99}Mo$ compositions). The gaseous stream will then leave the first cooling section, followed by entry into the second cooling section.

Next, the gaseous stream is cooled within the second cooling section of the reaction chamber which functions as a secondary condensation stage in the claimed process. The gaseous stream is cooled within the second cooling section from a starting temperature of about 300°–400° C. when the gaseous stream enters the second cooling section to an ending temperature of about 20°–80° C. when it exits the second cooling section. This step enables the vaporized $^{99m}Tc_2O_7$ within the gaseous stream to be condensed and removed from the stream so that a condensed $^{99m}Tc$-containing reaction product is produced inside the second cooling section of the reaction chamber. The condensed $^{99m}Tc$-containing reaction product is then collected from the second cooling section of the reaction chamber and purified as desired in accordance with the intended use of the final $^{99m}Tc$ product. Further information regarding the collection and purification processes will be discussed in greater detail below.

The present invention represents a significant advance in the production and separation of $^{99m}Tc$ compositions. High yields and purity levels are achieved in a manner which is clearly distinguishable from prior processes. As indicated below, the claimed invention involves many unique steps which provide numerous benefits ranging from improved separation efficiency to a lack of long-term nuclear wastes. These and other objects, features, and advantages of the invention shall be discussed below in the following Brief Description of the Drawings and Detailed Description of Preferred Embodiments.

DETAILED DESCRIPTION OF PREFERRED EMBODIMENTS

Figure 1:
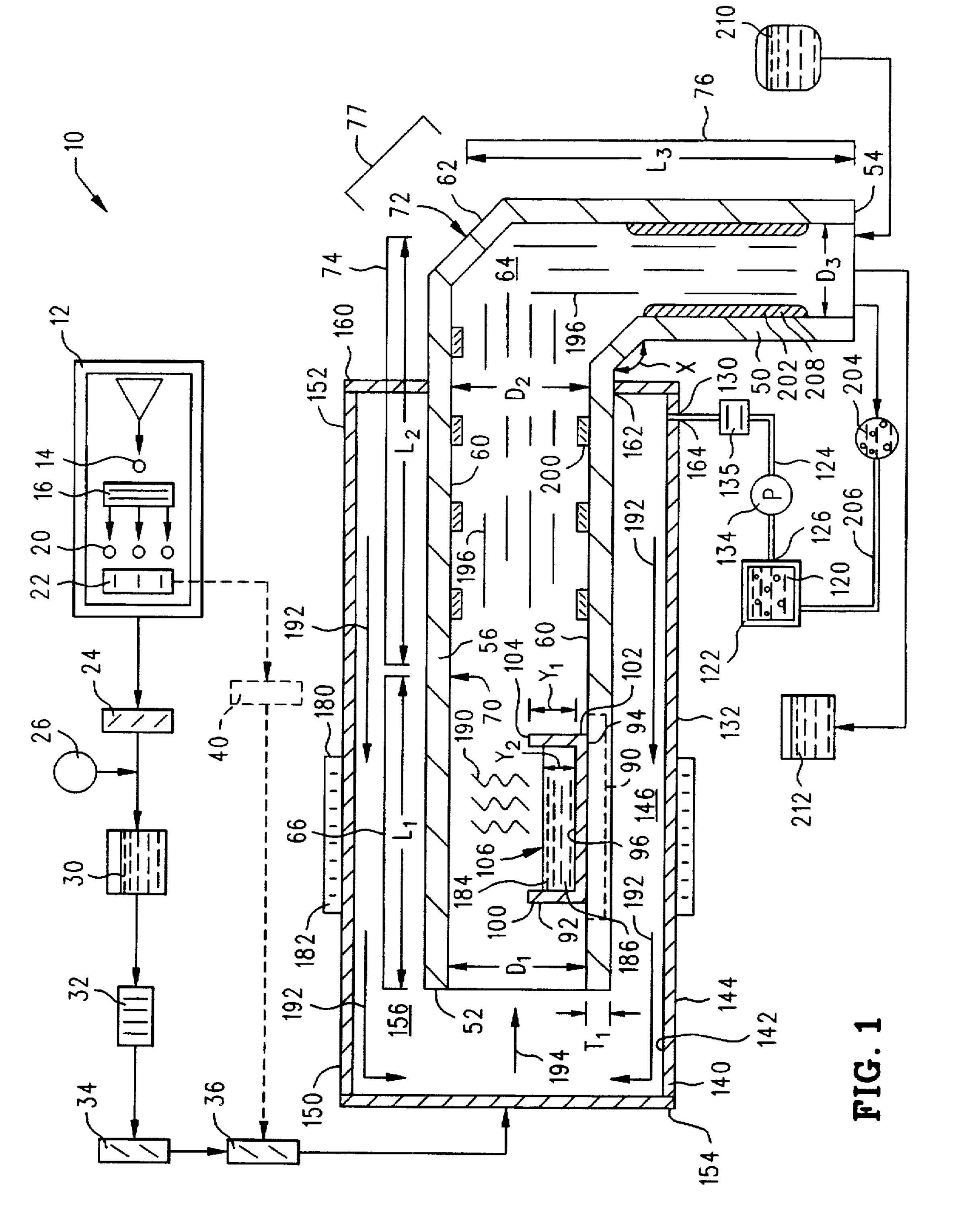
FIG. 1 is a schematic representation (partially in cross-section) of an exemplary processing system which may be used in accordance with the methods of the present invention.

As indicated above, the present invention involves a highly efficient method for producing purified $^{99m}Tc$ compositions from $^{99}Mo$ starting materials (e.g. $^{99}MoO_3$). This method is characterized by a number of significant benefits and advantages. The following description will involve preferred embodiments of the invention in which optimum operating parameters are disclosed. However, the claimed invention shall not be limited to the specific parameters provided below which are disclosed for example purposes. The most effective operating conditions for a given situation may be determined in accordance with routine preliminary pilot studies on the specific materials being processed and the equipment to be used for $^{99m}$Tc production.

A. Production of the $^{99}MoO_3$ Starting Material

The initial step in the claimed process involves the generation of a $^{99}MoO_3$ starting material which is ultimately treated to recover the desired $^{99m}$Tc compositions therefrom. The $^{99}MoO_3$ starting material may be generated in a preferred embodiment using two different approaches, both of which employ a particle accelerator apparatus. A "particle accelerator apparatus" basically consists of a particle (e.g. electron) accelerator unit which uses alternating voltages to accelerate electrons, protons, or heavy ions in a straight line. Representative particle (electron) accelerator systems may include a variety of different types ranging from a linear accelerator which accelerates particles in a straight line to a "racetrack" type system which accelerates particles in a circular or oval pathway. In this regard, the present invention shall not be limited to the use of a particular particle accelerator system, although a linear electron accelerator is preferred.

While the use of particle accelerator technology in the claimed methods is preferred, unique, and represents a significant development, other processes may also be employed to generate the $^{99}$Mo or $^{99}MoO_3$ starting materials in this case including cyclotron-type (proton-based) methods. Accordingly, the present invention shall not be restricted to any particular methods for generating the requisite starting materials.

With reference to FIG. 1, a system 10 which is suitable for use in accordance with the claimed invention is illustrated. A schematically-illustrated particle accelerator apparatus (e.g. an electron-based linear accelerator) is shown in FIG. 1 at reference number 12. Particle accelerators are known in the art for producing various radioactive species, and many different linear and non-linear accelerator systems may be employed for the purposes set forth below. While the present invention shall not be limited to any particular accelerator apparatus as noted above, a representative system suitable for use as the particle accelerator 12 will consist of a 15 kW electron accelerator unit having an MeV rating of up to about 40 MeV. Such a system is commercially available from many sources including Varian Associates of Palo Alto Calif. (USA)—[model "Clinac 35")]. This system has an operational capability of about 7 MeV–28 MeV, although in actual use, the system is operated at values of at least 10 MeV or more since about 10 MeV is the threshold energy level which is necessary in the photoneutron reactions of concern in the present invention. Likewise, custom-manufactured electron accelerators having the foregoing capabilities may be obtained from Titan Beta Corporation of Dublin Calif. (USA). While accelerator systems having a lower maximum energy level can be employed to produce the desired materials in accordance with the invention, it is preferred that a particle accelerator 12 be selected which is capable of maintaining energy levels of at least about 20 MeV so that sufficient amounts of the $^{99}$Mo starting materials can be generated.

Production of the $^{99}$Mo starting materials (e.g. $^{99}MoO_3$ or $^{99}$Mo metal which is subsequently converted to $^{99}MoO_3$) is accomplished by activating the particle accelerator 12 (e.g. electron linear accelerator) so that "bremsstrahlung" or high energy photons are generated within the accelerator 12 in a conventional manner as discussed in Weidemann, H., *Particle Accelerator Physics*, Springer-Verlag, pp. 25–74 (1993). To accomplish photon generation, the particle accelerator 12 in the preferred embodiment of FIG. 1 delivers electrons (schematically illustrated in FIG. 1 at reference number 14) to a substantially circular high atomic number target member 16 which is about 0.5–5 mm thick, with a diameter of about 1–10 cm. Optimal results will be achieved if the target member 16 is constructed from tungsten, although other materials may also be employed for this purpose (e.g. tantalum). Likewise, target members 16 with different dimensions (e.g. thicknesses) may be used in accordance with preliminary tests on the accelerators and materials of interest. When the electrons 14 strike the target member 16, they generate high energy photons or "bremsstrahlung" (schematically illustrated in FIG. 1 at reference number 20) which are then used to produce the desired $^{99}$Mo product.

As indicated above, the claimed process involves the separation of $^{99m}$Tc compositions (defined herein to encompass both $^{99m}$Tc and compounds thereof) from an initial supply of $^{99}MoO_3$. Two different methods may be used to provide the initial supply of $^{99}MoO_3$. While both of these methods preferably employ particle accelerator technology (which provides numerous benefits), they each involve different $^{100}$Mo starting materials. In a first embodiment schematically illustrated in FIG. 1, the starting material used to generate the initial supply of $^{99}MoO_3$ consists of a $^{100}$Mo-containing target 22 manufactured from $^{100}$Mo metal. The use of $^{100}$Mo metal for this purpose is preferred for many reasons.

For example, the use of $^{100}$Mo metal is preferred because the reaction rate of high-energy photons ("bremsstrahlung") during the production of $^{99}$Mo from $^{100}$Mo will be considerably higher compared with processes which use $^{100}$Mo compounds instead of $^{100}$Mo metal. Higher reaction rates exist when $^{100}$Mo metal is used because any other materials which are "compounded" with the initial $^{100}$Mo will scatter or absorb the photons and reduce the overall reaction rate. This is particularly true when $^{100}MoO_3$ is employed since three oxygen atoms will compete with each atom of $^{100}$Mo for interaction with the high energy photons. Interaction of the photons with oxygen atoms will generally reduce the energy of a given proportion of the photons over time to an energy level below the 8.3 MeV threshold value for the desired reaction. A representative target 22 constructed from $^{100}$Mo metal (which is substantially circular in configuration) will have the following dimensions: (1) thickness=about 5–50 mm; (2) diameter=about 5–20 mm; and (3) weight=about 1–150 g. However, these parameters may be experimentally varied as desired in view of many factors including the size and configuration of the selected particle accelerator 12.

To achieve a desired level of $^{99m}$Tc production within the system 10, enriched $^{100}$Mo metal is used in this embodiment to produce the $^{100}$Mo-containing target 22. The terms "enriched" and "enrichment" as used herein involve a known process in which the isotopic ratio of a material is changed to increase the amount of a desired isotope in the composition. The natural abundance of $^{100}$Mo is 9.63%. While this level will work in producing the desired $^{99m}$Tc products associated with the present invention, a greater level of enrichment is preferred in order to ensure that sufficient yields of the final $^{99m}$Tc compositions are generated. To achieve optimum results in this embodiment of the invention, an enrichment level of about 60–100% is desired.

The production of enriched $^{100}$Mo at these enrichment levels may be accomplished in many conventional ways. For example, $^{100}$Mo at about a 27% enrichment rate (which will still work but is somewhat less than the optimum values listed above) can be generated using standard nuclear fission processes in accordance with the following reaction: $^{235}$U (n,f)$^{100}$Mo. Other conventional methods for generating enriched $^{100}$Mo at higher enrichment levels include (1) electromagnetic separation in a mass spectrometer or calutron; and (2) gaseous diffusion separation of $MoF_6$. In addition, supplies of enriched $^{100}$Mo at the foregoing enrichment levels may be obtained from government and commercial sources including the Isotope Production and Distribution Program at Oak Ridge National Laboratory of Oak Ridge, Tenn. (USA) and URENCO of Almelo, Netherlands.

In addition to improving $^{99m}$Tc product yields in the system 10, the use of enriched $^{100}$Mo in the $^{100}$Mo-containing target 22 assists in minimizing the production of undesired impurities. These impurities result from (γ,n), (γ,2n), (γ,p), (γ,2p), and (γ,d) reactions involving other stable isotopes of Mo that may be present in the target 22. These are all nuclear reactions which exhibit a threshold energy, and can therefore be minimized by limiting the energy of the selected particle accelerator 12 while increasing its current at a given power output. The main radioimpurities which are produced from these reactions include radioactive isotopes of niobium, molybdenum and zirconium (e.g. $^{93m}$Mo, $^{90}$Mo, $^{96}$Nb, $^{95m}$Nb, $^{95}$Nb, $^{92}$Nb, $^{91m}$Nb, $^{90}$Nb, and $^{95}$Zr). Because these radioimpurities result from the presence of non-$^{100}$Mo isotopes as indicated above, it is desired that the target 22 be constructed from $^{100}$Mo metal with as high a $^{100}$Mo enrichment level as possible. Furthermore, the use of enriched $^{100}$Mo generated from nuclear fission processes also provides improved purity levels in the final $^{99m}$Tc products generated by the system 10. Fission product molybdenum has neither $^{92}$Mo or $^{94}$Mo therein, and likewise includes about sixteen times less $^{96}$Mo compared with natural molybdenum. The absence of $^{92}$Mo and $^{94}$Mo entirely eliminates over 50% of all the potential impurity-producing reactions. Likewise, low amounts of $^{96}$Mo also substantially reduce the number of undesired side reactions.

To produce $^{99}MoO_3$ from the target 22 comprised of $^{100}$Mo metal, high energy photons 20 generated within the particle accelerator 12 come in contact with the target 22, thereby causing photoneutron, photoproton, and other photonuclear reactions. As a result, $^{99}$Mo metal is generated. This process and the reactions associated therewith are summarized in Davydov, M., et al., "Preparation of $^{99}$Mo and $^{99m}$Tc in Electron Accelerators", *Radiokhimiva*, 35(5) :91–96 (September–October 1993) which is incorporated herein by reference as noted above. Specifically, the following reactions as discussed in Davydov, M. et al., *supra*, are involved in the production of $^{99}$Mo metal from $^{100}$Mo metal wherein $E_t$=the reaction threshold:

$$^{100}Mo(\gamma,n)^{99}Mo\ (E_t=9.1\ MeV) \quad (9)$$

$$^{100}Mo(\gamma,p)^{99}Nb\ (T_{1/2}=15\ sec.)\rightarrow{}^{99}Mo\ (E_t=16.5\ MeV) \quad (10)$$

$$^{100}Mo(\gamma,p)^{99m}Nb\ (T_{1/2}=2.6\ min.)\rightarrow{}^{99}Mo\ (E_t=16.9\ MeV) \quad (11)$$

$$^{100}Mo(n,2n)^{99}Mo\ (E_t=8.3\ MeV) \quad (12)$$

$$^{98}Mo(n,\gamma)^{99}Mo \quad (13)$$

While Davydov et al. presents the basic details of accelerator-produced $^{99}$Mo, it does not describe methods or processes for separating the $^{99}$Mo parent from its $^{99m}$Tc daughter as discussed further below which is a key aspect of the present invention.

A preferred irradiation time associated with the target 22 produced from $^{100}$Mo metal is about 24–48 hours using the representative accelerator systems described above. However, this parameter may be varied in accordance with numerous factors including the type of system being employed and its desired output. Irradiation times which are too short (generally less than about 24 hours) will increase the amount of $^{100}$Mo metal required within the system 10, thereby resulting in additional operating costs. Likewise, irradiation times that are too long (generally more than about 48 hours) will produce a greater degree of quality variation and fluctuation in the average Ci output levels associated with the final $^{99m}$Tc product. Use of the foregoing parameters within the system 10 will typically result in a $^{99}$Mo metal product with an activity level at the end of irradiation of about 1–5 Ci/g. This level is comparable to the activity levels achieved when "activation moly" is generated by the neutron activation of enriched $^{98}$Mo in high flux nuclear reactors. As discussed in further detail below, the foregoing activity level will ultimately generate an average $^{99m}$Tc composition output of about 20 Ci per day.

At this stage in the production process, a supply of $^{99}$Mo metal (shown at reference number 24 in FIG. 1) is generated from the $^{100}$Mo-containing target 22. However, as noted above, the $^{99m}$Tc isolation process of the claimed invention involves the use of an initial supply of $^{99}MoO_3$ as a starting material. Accordingly, the $^{99}$Mo metal 24 must be converted into $^{99}MoO_3$ in a rapid and efficient manner. To accomplish this, the accelerator-generated $^{99}$Mo metal 24 is allowed to stabilize for a rest period of at least about one hour or more. During this stabilization period, low-level radioimpurities having a half-life of less than about several minutes will decay. This process assists in increasing the purity of the $^{99m}$Tc final product. Thereafter, the stabilized $^{99}$Mo metal 24 is dissolved in at least one oxygen-containing solvent material 26 to generate a solvated (liquified) $^{99}$Mo product 30 schematically shown in FIG. 1. In a preferred embodiment, the solvent material 26 will consist of 6–9M $HNO_3$ (optimally heated to a temperature exceeding about 70° C.). However, other compositions may be used for this purpose including but not limited to $H_2SO_4$ (at a free acid concentration of 0.12M heated to about 100° C.) or $H_2O_2$. To produce the solvated $^{99}$Mo product 30, the $^{99}$Mo metal 24 will optimally be combined with the selected solvent material 26 in a metal 24: solvent material 26 weight ratio of about 1–5:1–25. However, this ratio represents an exemplary embodiment which may be varied in accordance with preliminary pilot studies on the particular materials being processed. The solvated $^{99}$Mo product 30 is then dried in a sealed oven apparatus 32 of conventional design at a temperature of about 50°–100° C. for about 0.5–2 hours in order to generate a dried $^{99}$Mo compound 34. From a chemical standpoint, the dried $^{99}$Mo compound consists of $^{99}MoO_3$. Accordingly, the dried $^{99}$Mo composition 34 involves the initial supply of $^{99}MoO_3$ (designated at reference number 36 in FIG. 1) that is used in the next stage of the $^{99m}$Tc production/isolation process.

The foregoing procedure which uses $^{100}$Mo metal as the $^{99}$Mo-containing target 22 represents a preferred embodiment for the reasons listed above. However, an alterative method exists for producing the initial supply 36 of $^{99}MoO_3$. Instead of using $^{100}$Mo metal in the $^{100}$Mo-containing target 22, it is also possible to employ a target 22 manufactured from $^{100}MoO_3$. Enriched $^{100}MoO_3$ is preferably employed for this purpose, with the term "enriched" being defined above. An optimum enrichment level will be about 60–100%. The production of $^{100}MoO_3$ at these enrichment levels may be accomplished in many conventional ways. For example, $^{100}MoO_3$ at lower but usable enrichment levels may be produced using standard nuclear fission processes. Other conventional methods for generating enriched $^{100}MoO_3$ at higher enrichment levels include (1) electromagnetic separation in a mass spectrometer or calutron; and (2) gaseous diffusion separation procedures. In addition, supplies of enriched $^{100}MoO_3$ at the foregoing enrichment levels may be obtained from government and commercial sources including the Isotope Production and Distribution Program at Oak Ridge National Laboratory of Oak Ridge, Tenn. (USA) and URENCO of Almelo, Netherlands.

In addition to improving $^{99m}Tc$ product yields in the system 10, the use of enriched $^{100}MoO_3$ in the target 22 at the foregoing levels again assists in minimizing the generation of undesired impurities. Impurities result from (γ,n), (γ,2n), (γ,p), (γ,2p), and (γ,d) reactions involving other stable isotopes of molybdenum which may be present in the target 22. All of these reactions exhibit a threshold energy, and can therefore be minimized by limiting the energy of the selected particle accelerator 12 while increasing its current at a given power output. The main radioimpurities which are produced from these reactions include radioactive isotope compositions comprised of niobium and zirconium (e.g. $^{93m}Mo$, $^{90}Mo$, $^{96}Nb$, $^{95m}Nb$, $^{95}Nb$, $^{92}Nb$, $^{91m}Nb$, $^{90}Nb$, and $^{95}Zr$). Because these radioimpurities result from the presence of non-$^{100}Mo$ isotopes as indicated above, it is desired that the target 22 be constructed from $^{100}MoO_3$ with as high an enrichment level as possible.

A representative target 22 (e.g. of substantially circular configuration) constructed from $^{100}MoO_3$ will have the following dimensions: (1) thickness=about 20–100 mm; (2) diameter=about 10–20 mm; and (3) weight=about 5–150 g. However, these parameters may be experimentally varied as desired in view of many factors including the size and configuration of the selected particle accelerator 12.

To produce $^{99}MoO_3$ from the target 22 comprised of $^{100}MoO_3$, the high energy photons 20 are generated within the accelerator 12 in the same manner described above in connection with first embodiment. As the high energy photons 20 strike the target 22 they induce photoneutron, photoproton, and other photonuclear reactions. As a result, $^{99}MoO_3$ is generated in accordance with substantially the same reactions listed above in connection with the production of $^{99}Mo$ metal from $^{100}Mo$ metal (e.g. reactions (9)–(13)). Accordingly, the following general reactions are involved in the production of $^{99}MoO_3$ from $^{100}MoO_3$:

$$^{100}MoO_3(\gamma,n)^{99}MoO_3 \quad (14)$$

$$^{100}MoO_3(\gamma,p)^{99}NbO_3\ (T_{1/2}{=}15\ \text{sec.})\rightarrow{}^{99}MoO_3 \quad (15)$$

$$^{100}MoO_3(\gamma,p)^{99m}NbO_3\ (T_{1/2}{=}2.6\ \text{min.})\rightarrow{}^{99}MoO_3 \quad (16)$$

$$^{100}MoO_3(n,2n)^{99}MoO_3 \quad (17)$$

$$^{98}MoO_3(n,\gamma)^{99}MoO_3 \quad (18)$$

A preferred irradiation time associated with the target 22 manufactured from $^{100}MoO_3$ is about 24–48 hours using the representative particle accelerator systems described above. However, this parameter may be varied in accordance with numerous factors including the type of system being employed and its desired output. Irradiation times which are too short (generally less than about 24 hours) will again increase the amount of $^{100}MoO_3$ required within the system 10, thereby causing additional operating costs. Likewise, irradiation times that are too long (generally more than about 48 hours) will cause a greater degree of quality variation and fluctuation in the average Ci output levels associated with the final $^{99m}Tc$ product. Use of the foregoing parameters within the system 10 will typically generate an irradiated $^{99}MoO_3$ product with an activity level at the end of irradiation of about 1–5 Ci/g.

In accordance with the procedure described above, a $^{99}MoO_3$ product is directly generated from the $^{100}MoO_3$-containing target 22. This product is designated in dashed lines at reference number 40 in FIG. 1. The accelerator-generated $^{99}MoO_3$ product 40 is then allowed to stabilize for a rest period of at least about one hour or more. During stabilization, low-level radioimpurities having a half-life of less than about several minutes will decay. This process increases the purity of the $^{99m}Tc$ final product. Thereafter, the stabilized product 40 may be used directly as the initial supply 36 of $^{99}MoO_3$ in the next stage of the $^{99m}Tc$ production/isolation system. Production of the initial supply 36 of $^{99}MoO_3$ using a target 22 comprised of $^{100}MoO_3$ avoids the solvent-based method described above (e.g. which is employed when a target 22 manufactured from $^{100}Mo$ metal is employed). However, the use of a target 22 comprised of $^{100}Mo$ is preferred over a $^{100}MoO_3$-containing target 22 in most cases for the reasons listed above. The selection of either method for producing the initial supply 36 of $^{99}MoO_3$ will depend on numerous factors as determined by preliminary pilot experimentation, including the parameters associated with the particle accelerator 12 being employed, as well as cost and availability factors associated with the starting materials of interest. Accordingly, the present invention shall not be limited to any particular method for generating the initial supply 36 of $^{99}MoO_3$ in the claimed process.

Regardless of which method is selected to produce the initial supply 36 of $^{99}MoO_3$, the use of particle accelerator technology for this purpose represents a departure from conventional methods, especially those involving nuclear reactors which generate "fission moly". The use of a particle (e.g. electron) accelerator 12 at this stage in the system 10 reduces the costs, labor, and risks compared with reactor-produced (e.g. fission-generated) $^{99}Mo$ products. Likewise, the present method avoids the generation of large amounts of long-term radioactive wastes. While various waste products may be created using particle accelerator technology as described above (depending to a certain extent on the level of enrichment associated with the $^{100}Mo$ metal or $^{100}MoO_3$ starting materials), only small amounts (e.g. typically less than millicurie quantities) of low-level wastes are generated. All of these wastes have less than about 120-day half-lives. Accordingly, the application of particle accelerator technology to a $^{99m}Tc$ purification process is an important development and a clear departure from prior fission-based methods.

B. A System for Separating and Isolating $^{99m}Tc$ Reaction Products from $^{99}MoO_3$ This stage of the claimed process is schematically illustrated in FIG. 1. It specifically involves the separation and isolation of $^{99m}Tc$ "daughter" compositions from the initial supply 36 of "parent" $^{99}MoO_3$. The methods and procedures used to accomplish separation represent a substantial departure from prior methods (including conventional sublimation processes) as discussed below.

With reference to FIG. 1, an elongate tubular reaction chamber 50 is provided in which $^{99m}Tc$ separation is accomplished. While many different configurations, dimensions, materials, and components may be used in connection with the reaction chamber 50, a representative and preferred chamber 50 will now be described. The term "tubular" as used herein shall generally signify an elongate structure having a bore or passageway therethrough surrounded by a continuous wall as discussed below. While the cross-sectional configuration of the reaction chamber 50 is preferably circular in order to facilitate the removal of desired materials from the internal regions of the chamber 50, numerous alternative cross-sectional configurations may be employed (e.g. square, rectangular, and the like). In a preferred embodiment, the reaction chamber 50 is preferably of single piece, seamless construction in order to avoid undesired recesses, crevices, and the like which can trap various reaction products and decrease product yields. Regarding construction materials used to manufacture the reaction chamber 50, many different compositions may be employed, with the present invention not being limited to any particular materials for this purpose. However, exemplary and preferred construction materials suitable for use in producing the reaction chamber 50 will consist of quartz, an alloy of Ni—Cr, or stainless steel. An optional protective layer of platinum or gold may be applied to the interior surfaces of the chamber 50 at a thickness of about 0.025–2.5 mm if desired as determined by preliminary tests in order to protect the chamber 50 from corrosion caused by vaporized $^{99}MoO_3$.

With continued reference to FIG. 1, a schematic (cross-sectional) illustration of the reaction chamber 50 is provided. The chamber 50 specifically includes an open first end 52, an open second end 54, and a continuous annular side wall 56. In a preferred embodiment, the side wall 56 is of seamless construction (as noted above) and has a preferred thickness "$T_1$" (FIG. 1) of about 0.5–10 mm. The thickness "$T_1$" of the side wall 56 will be uniform along the entire length of the reaction chamber 50 unless otherwise indicated or illustrated in FIG. 1. The side wall 56 also has an inner surface 60 and an outer surface 62 as shown in FIG. 1.

Positioned within the reaction chamber 50 and entirely surrounded by the side wall 56 is an internal passageway 64 which extends continuously through the reaction chamber 50 from the first end 52 to the second end 54. The diameter values associated with the passageway 64 through the reaction chamber 50 will be discussed in further detail below. With reference to FIG. 1, the elongate tubular reaction chamber 50 is divided into three main sections, each performing a unique and distinctive function which clearly distinguishes the present method from prior processing systems. Specifically, the reaction chamber 50 first includes a heating section 66 which begins at the first end 52 of the chamber 50 and ends at position 70 shown in FIG. 1. In a preferred embodiment, the heating section 66 will have a length "$L_1$" (FIG. 1) of about 1–100 cm from the first end 52 of the chamber 50 to position 70 as shown, depending on whether a small, laboratory-scale testing system 10 or a large scale commercial system 10 is desired. The diameter "$D_1$" (FIG. 1) of the passageway 64 within the heating section 66 in an exemplary embodiment of the present invention will be about 1–10 cm which is sufficient to accommodate a containment vessel of variable size therein (discussed below) for retaining the initial supply 36 of $^{99}MoO_3$ within the reaction chamber 50. A heating system (e.g. heating means) is also associated with the heating section 66 to apply the necessary amount of thermal energy to the initial supply 36 of $^{99}MoO_3$ as described in further detail below.

Beginning at position 70 of the reaction chamber 50 and terminating at position 72 illustrated in FIG. 1 is a first cooling section 74 which functions as a primary condensation stage in the claimed method. The first cooling section 74 is in fluid communication with the heating section 66 as shown. In a preferred embodiment, the first cooling section 74 will have a length "$L_2$" (FIG. 1) of about 10–100 cm from position 70 to position 72. The operational capabilities of the first cooling section 74 will be discussed further below. In addition, the diameter "$D_2$" (FIG. 1) of the passageway 64 within the first cooling section 74 will be about 1–10 cm in an exemplary and preferred embodiment.

Finally, beginning at position 72 on the reaction chamber 50 and terminating at the second end 54 of the chamber 50 is a second cooling section 76 which functions as a secondary condensation stage in the claimed method. As shown in FIG. 1, this design configuration will place the first cooling section 74 between the heating section 66 and second cooling section 76 to complete the three-stage reaction chamber 50. Likewise, the second cooling section 76 is in fluid communication with the first cooling section 74. In a preferred embodiment, the second cooling section 76 will have a length "$L_3$" (FIG. 1) of about 1–100 cm from position 72 to the second end 54 of the reaction chamber 50. The operational capabilities of the second cooling section 76 will be discussed further below. In addition, the diameter "$D_3$" of the passageway 64 within the second cooling section 76 will be about 0.1–5 cm in a representative embodiment.

With reference to FIG. 1, the point of transition between the first cooling section 74 and the second cooling section 76 (e.g. at position 72) will involve a bevelled section 77 which is designed to avoid sharp angles within the passageway 64 so that the trapping of condensed reaction products is avoided. For the purposes of this embodiment, the transition between the cooling sections 74, 76 is considered to take place at position 72 which is substantially in the middle of the bevelled section 77. The length values $L_2$ and $L_3$ associated with the first and second cooling sections 74, 76 as shown in FIG. 1 are measured in a manner which takes into consideration the fact that the approximate transition point between the sections 74, 76 occurs at position 72 within the bevelled section 77.

As further discussed below, the length values $L_2$ and $L_3$ associated with the first and second cooling sections 74, 76 are functionally important and facilitate the complete separation and isolation of the desired $^{99m}Tc$ compositions from the initial supply 36 of $^{99}MoO_3$. The negative temperature gradients associated with the first and second cooling sections 74, 76 are of considerable significance and should be carefully controlled to achieve a final $^{99m}Tc$ product of maximum purity and yield. Regarding the basic design of the reaction chamber 50, it may be manufactured so that it is entirely linear (e.g. 180°) with the first end 52 of the chamber 50 being in axial alignment with the second end 54. However, in the embodiment of FIG. 1, the second cooling section 76 is positioned at an angle "X" of about 15°–165° (optimally about 90° as illustrated in FIG. 1) relative to the first cooling section 74.

In accordance with the angular relationship described above, the "line of sight" between the first cooling section 74 and the second cooling section 76 is interrupted. This relationship is designed to create separate and distinct temperature gradients within the first and second cooling sections 74, 76 of the chamber 50 so that fractional condensation can occur therein with a maximum degree of efficiency. As discussed below, the first and second cooling sections 74, 76 are each designed to remove different chemical compositions from the gaseous materials flowing through the chamber 50 with minimal carryover from one section to the other. It is therefore important to avoid the uncontrolled transfer of thermal energy (e.g. heat) from the first cooling section 74 to the second cooling section 76 during the condensation process. Otherwise, the tightly-controlled temperature gradients within the first and second cooling sections 74, 76 will be altered which could effect purity levels in the final $^{99m}$Tc product. This goal is accomplished in the embodiment of FIG. 1 by positioning the second cooling section 76 at angle "X" relative to the first cooling section 74 as described above. In this manner, radiant and convective heat transfer from the first cooling section 74 into the second cooling section 76 is effectively avoided. The prevention of heat transfer using this approach will enable the reaction chamber 50 to function with a maximum degree of effectiveness.

With continued reference to FIG. 1, the heating section 66 is sized to receive the initial supply 36 of $^{99}MoO_3$ therein which is subsequently processed (e.g. melted) as discussed further below. Receipt (e.g. placement) of the initial supply 36 of $^{99}MoO_3$ within the reaction chamber 50 may be accomplished using two different approaches. First, a cavity may be directly formed within the side wall 56 inside the reaction chamber 50, the outline of which is illustrated in dashed lines at reference number 90 in FIG. 1. However, in a preferred embodiment, an open containment vessel 92 shown cross-sectionally in FIG. 1 is positioned within the heating section 66 of the reaction chamber 50. The containment vessel 92 (also known as a "boat") is placed directly on the inner surface 60 of the side wall 56 at position 94 as illustrated. The containment vessel 92 includes a closed bottom portion 96, upwardly-extending side portions 100, 102, and an open top portion 104. These components define an interior region 106 within the containment vessel 92 which is sized to receive the initial supply 36 of $^{99}MoO_3$ therein. During implementation of the claimed process, the initial supply 36 of $^{99}MoO_3$ will be melted inside the containment vessel 92 to form a pool of molten $^{99}MoO_3$ therein. The specific depth of this pool is of considerable significance and represents an inventive concept of primary importance as discussed further below. To form a pool of molten $^{99}MoO_3$ within the containment vessel 92 having the desired depth characteristics, the depth "$Y_1$" (FIG. 1) of the interior region 106 will optimally be about 1–50 mm, again depending on whether a small-scale laboratory system 10 or a large scale commercial system 10 is involved. In a preferred embodiment, the interior region 106 of the containment vessel 92 will have a length of about 1–100 cm and a width of about 1–10 cm so that the interior region 106 has a total internal volume of about 0.1–5000 $cm^3$. However, these values may be varied within the foregoing ranges as necessary in accordance with numerous factors including the desired size and capacity of the processing system 10, with all of the selected systems 10 working in the same manner regardless of size/capacity. Finally, optimum results will be achieved if the containment vessel 92 is manufactured from a composition which facilitates even and complete heating of the initial supply 36 of $^{99}MoO_3$ within the reaction chamber 50. The selected composition should also be sufficiently strong to accommodate the various phase and temperature changes experienced by the initial supply 36 of $^{99}MoO_3$ in the system 10 during operation. These benefits are achieved through the use of a containment vessel 92 made of platinum or a platinum alloy (e.g. Pt—Rh [90:10]). Other construction materials which may be employed for this purpose include an alloy of Ni—Cr, stainless steel, or quartz. These materials may be coated with an optional surface layer of platinum or gold at an average thickness of about 0.025–2.5 mm in order to prevent corrosion caused by vaporized $^{99}MoO_3$ in the system 10. However, to a achieve a maximum degree of stability and effectiveness, the containment vessel 92 will be manufactured from platinum or a platinum alloy, or will be coated with platinum as noted above with the phrase "comprised of platinum" encompassing all of these variations.

An additional aspect of the system 10 involves the use of an oxidizing gas which is introduced into reaction chamber 50. While the function of the oxidizing gas will be described in further detail below, it is basically used to (1) move the desired gaseous (vaporized) reaction products through the system 10 for processing; and (2) convert various vaporized $^{99m}$Tc compositions (e.g. $^{99m}TcO_3$ and $^{99m}TcO_2$) into $^{99m}Tc_2O_7$. Many different procedures and structural components may be used to deliver the gas into and through the reaction chamber 50. Accordingly, the present invention shall not be limited to any particular gas delivery methods or structures. However, a preferred gas delivery sub-system is schematically illustrated in FIG. 1.

With reference to FIG. 1, a supply of an oxygen-containing oxidizing gas 120 is provided which is retained within a storage container 122 of conventional design (e.g. made of steel or the like). As indicated below, representative oxygen-containing oxidizing gases 120 suitable for the purposes set forth herein will include $O_{2(g)}$, air, $O_{3(g)}$, $H_2O_{2(g)}$, or $NO_{2(g)}$, with $O_{2(g)}$ being preferred because of its effectiveness and ease of use. The storage container 122 is operatively connected to a tubular gas flow conduit 124 having a first end 126 and a second end 130. The first end 126 is attached to the storage container 122, with the second end 130 being connected to a cylindrical gas delivery unit 132 which surrounds both the heating section 66 and at least a portion of the first cooling section 74 of the reaction chamber 50. Positioned in-line within the gas flow conduit 124 is a conventional pump 134 (e.g. of a standard diaphragm type or other variety known and used for gas delivery). Alternatively, the pump 134 may be eliminated provided that the gas 120 is retained within the storage container 122 at a pressure level sufficient to ensure rapid and effective delivery of the gas 120 through the gas flow conduit 124 (e.g. about 1–3000 psi depending on the scale of the system 10). The gas flow conduit 124 may also have an optional in-line heater 135 therein which can be used to selectively heat the gas 120 during delivery if needed in accordance with preliminary pilot studies on the particular materials and system components being employed. The heater 135 may consist of any conventional (e.g. resistance-type) heater unit known in the art for the purposes set forth above. In-line heating using the heater 135 is designed to pre-heat the gas 120 to a temperature of about 20°–900° C. as it enters the gas delivery unit 132 so that optimum temperature levels may be maintained within the reaction chamber 50 while avoiding "cold spots".

As illustrated cross-sectionally in FIG. 1, the gas delivery unit 132 (which is configured in the form of an enclosed cylindrical jacket) entirely encompasses the first end 52 of the reaction chamber 50, as well as the heating section 66 and all or part (at least 50–75%) of the first cooling section 74. In a preferred embodiment, the gas delivery unit 132 and its various components will be constructed of an inert, heat-resistant material (e.g. silica glass, quartz, or a selected metal such as stainless steel). The gas delivery unit 132 includes a continuous tubular side wall 140 which is preferably circular (annular) in cross-section with an inner surface 142 and an outer surface 144. With reference to FIG. 1, the side wall 140 is sufficiently large to completely surround the heating section 66 and most of the first cooling section 74 of the reaction chamber 50. This size relationship enables the inner surface 142 of the side wall 140 to be spaced outwardly from the outer surface 62 of the reaction chamber 50 to create an annular gas flow zone 146 around the heating section 66 and first cooling section 74 as illustrated. In addition, the side wall 140 associated with the gas delivery unit 132 further includes a closed first end 150 and a closed second end 152. The first end 150 of the side wall 140 has an end plate 154 secured thereto (e.g. by welding or other conventional fastening method) in order to effectively seal the first end 150. In a preferred embodiment, the end plate 154 is manufactured from the same materials which are used to produce the other parts of the gas delivery unit 132 as discussed above. With continued reference to FIG. 1, the end plate 154 is spaced outwardly from the first end 52 of the reaction chamber 50 in order to form an open region 156 therebetween which functions as part of the gas flow zone 146 described above.

The second end 152 of the side wall 140 includes an end plate 160 secured thereto. The end plate 160 is designed to effectively seal the second end 152 of the side wall 140 and is secured thereto by welding or other conventional fastening method. The end plate 160 is preferably manufactured from the same materials listed above in connection with the other components of the gas delivery unit 132. The end plate 160 further includes an opening 162 therein which is sized to allow the annular side wall 56 of the reaction chamber 50 to pass therethrough. To effectively secure the end plate 160 in position as illustrated in FIG. 1, the outer surface 62 of the reaction chamber 50 is sealed to and within the opening 162 of the end plate 160 by conventional sealing methods (e.g. o-rings, gaskets, and/or a screw-type thread system of standard design associated with the reaction chamber 50 and the opening 162).

Finally, with continued reference to FIG. 1, the second end 152 of the side wall 140 used in connection with the cylindrical gas delivery unit 132 further includes a bore 164 therethrough. The bore 164 is sized to receive the second end 130 of the gas flow conduit 124. As previously noted, the gas flow conduit 124 is operatively connected to the storage container 122 having the oxidizing gas 120 therein. The second end 130 of the conduit 124 is retained within the bore 164 by conventional attachment methods including adhesives, frictional engagement, and/or conventional mechanical fasteners. In this manner, gas 120 from the storage container 122 can be delivered at a rapid rate to the system 10. Likewise, as discussed further below, the specific design of the gas delivery unit 132 will enable the gas 120 to be supplied in a counter-current flow orientation. Many benefits may be achieved using this approach, including the controlled cooling of materials within the first cooling section 74 in a highly efficient manner. As a result, a precise negative temperature gradient will be maintained within the first cooling section 74 so that the fractional condensation process can occur with a maximum degree of selectivity.

While the gas delivery process illustrated in FIG. 1 is preferred, an alternative embodiment (not shown) would involve direct attachment of the second end 130 of the gas flow conduit 124 to the first end 52 of the reaction chamber 50 using connection hardware known in the art for this purpose. The oxidizing gas 120 would then be delivered directly to the reaction chamber 50 without using the cylindrical gas delivery unit 132 described above. This embodiment would reduce the required amount of equipment in the system 10 and may be appropriate in various circumstances as determined by many factors including the type of system 10 under consideration, the desired scale of operation, and other related issues. Accordingly, the present invention shall not be limited to any particular gas delivery method.

While the heating and cooling characteristics of the reaction chamber 50 are important aspects of the claimed process, the present invention shall not be restricted to any particular methods, components, or sub-systems which are used to provide the necessary degree of temperature control. The claimed method may involve many different procedures and sub-systems for achieving the desired temperature conditions within the heating section 66, first cooling section 74, and second cooling section 76. Again, routine preliminary investigations may be employed to determine the heating and cooling systems which will provide optimum results in a given situation. However, FIG. 1 schematically illustrates various components which can be used to produce the desired thermal effects in the reaction chamber 50. With reference to FIG. 1, the heating section 66 includes heating means 180 associated therewith. In a preferred embodiment, the heating means 180 will consist of a heater unit 182 positioned around the heating section 66 as illustrated. In the system 10 of FIG. 1, the heater unit 182 surrounds the outer surface 144 of the side wall 140 associated with the gas delivery unit 132. This particular arrangement of components not only heats the initial supply 36 of $^{99}MoO_3$ within the heating section 66, but also maintains the incoming oxidizing gas 120 in the gas delivery unit 132 at stable and desired temperature levels of about 700°–900° C. (in cooperation with the heater 135 if necessary). In the alternative embodiment described above which does not use the gas delivery unit 132 and related components, the heater unit 182 would surround the outer surface 62 of reaction chamber 50 at the heating section 66.

In either embodiment, the heater unit 182 (which is schematically illustrated in FIG. 1) may involve many different systems which are known in the art for the general purposes set forth above. The heater unit 182 may consist of a single heating apparatus or a plurality of individual heating sub-systems with separate control units to achieve selective temperature adjustment at various positions on the heating section 66. Accordingly, the claimed invention shall not be limited to any particular type of heating system, provided that temperature levels of about 800°–900° C. are maintained within the heating section 66 so that the initial supply 36 of $^{99}MoO_3$ can be melted as discussed below. In an exemplary and preferred embodiment, the heater unit 182 will specifically consist of a conventional tube furnace assembly or selected heating elements (e.g. nichrome wires) wrapped around the outer surface 144 of the gas delivery unit 132 or around the outer surface 62 of the reaction chamber 50 if a gas delivery unit 132 is not employed.

In the first cooling section 74 and the second cooling section 76, progressive decreases in temperature spontaneously result from convective radiant heat losses as the distance from the heating section 66 (and heating means 180) increases. In the embodiment of FIG. 1, gradual temperature decreases within the first cooling section 74 are facilitated by the counter-current movement of oxidizing gas 120 through the gas delivery unit 132 along the outer surface 62 of the reaction chamber 50. This situation will take place even if the gas 120 is preheated using the heater 135 since, during movement of the gas 120 through the system 10, it will carry heat away from the first cooling section 74 as it travels toward the first end 52 of the chamber 50. Also, in many cases, the temperature of the gas 120 will be much less than the temperature levels within the first cooling section 74, depending on the level of heating provided by the heater 135 (which may be used to heat the incoming gas 120 to a temperature within a broad range as noted above.) Further information on the desired temperature characteristics in the first cooling section 74 will be discussed below. Regarding the second cooling section 76, cooling is preferably provided by direct contact of the second cooling section 76 with ambient air. As a result, the second cooling section 76 in the embodiment of FIG. 1 is uncovered and exposed so that the outer surface 62 of the reaction chamber 50 at the second cooling section 76 can come in contact with air at "room temperature" levels (e.g. about 20°–25° C.). This design will enable the necessary temperature decreases to occur in the second cooling section 76, with additional information on the second cooling section 76 being provided below.

Finally, either or both of the first and second cooling sections 74, 76 may be connected to external auxiliary cooling systems of conventional design (e.g. water jackets, chiller coils, and the like). These systems (not shown) would preferably surround the first cooling section 74, the second cooling section 76, and/or the bevelled section 77 where the first cooling section 74 meets the second cooling section 76. While auxiliary cooling units are not a requirement in system 10, they may be needed to achieve a desired level of efficiency as determined by preliminary experimentation involving many factors including the size of the selected reaction chamber 50, the materials being processed, the ambient environmental conditions (temperatures) experienced by the system 10, and other factors. Accordingly, the present invention shall not be limited to any particular heating/cooling systems, provided that the necessary temperature gradients are achieved in the system 10 as discussed below.

C. A Preferred Method for Separating and Isolating $^{99m}Tc$ Reaction Products from $^{99}MoO_3$ A preferred method for separating and isolating $^{99m}Tc$ reaction products from the initial supply 36 of $^{99}MoO_3$ will now be discussed with reference to the system 10 shown in FIG. 1. As previously noted, the claimed method shall not be restricted to the specific reaction chamber 50 of FIG. 1. Alternative reactor systems may be employed as long as they allow the necessary temperature conditions to be achieved.

In accordance with the embodiment of FIG. 1, the initial supply 36 of $^{99}MoO_3$ (manufactured as described above) is placed within the containment vessel 92 in the heating section 66 of the reaction chamber 50. Alternatively, if an internal cavity is formed within the side wall 56 of the reaction chamber 50 as indicated by dashed lines 90 in FIG. 1, the initial supply 36 of $^{99}MoO_3$ is placed within the cavity.

Next, the initial supply 36 of $^{99}MoO_3$ is heated in the heating section 66 of the reaction chamber 50 to a controlled temperature of about 800°–900° C. using the heating means 180. This temperature is sufficient to produce a supply 184 of molten $^{99}MoO_3$ within the interior region 106 of the containment vessel 92. Unlike prior sublimation methods which require the initial $^{99}MoO_3$ to be processed in particulate form (e.g. involving particles have an average diameter of about 1–1000μ), this requirement does not exist in the present invention. The supply 184 of molten $^{99}MoO_3$ is retained within the interior region 106 of the containment vessel 92 in order to form a pool 186 of molten $^{99}MoO_3$ therein. As a further consequence of the foregoing temperature levels within the heating section 66, a gaseous mixture 190 is formed which is produced within the pool 186 of molten $^{99}MoO_3$. The mixture 190 thereafter evolves directly from the pool 186 as schematically illustrated in FIG. 1. The gaseous mixture 190 will include the following components in combination: (1) vaporized $^{99}MoO_3$; (2) vaporized $^{99m}TcO_3$; and (3) vaporized $^{99m}TcO_2$. A small amount of vaporized $^{99m}Tc_2O_7$ may also be produced. However, it believed that the amount of any vaporized $^{99m}Tc_2O_7$ in the gaseous mixture 190 will be so small that, for the sake of clarity and convenience, the gaseous mixture 190 at this stage will be designated to only include vaporized $^{99m}TcO_3$ and vaporized $^{99m}TcO_2$.

In a preferred embodiment, the containment vessel 92 and the amount of initial supply 36 of $^{99}MoO_3$ used in the vessel 92 will be selected so that the pool 186 has a depth "$Y_2$" (FIG. 1) of about 0.5–5 mm. The particular depth provides numerous advantages in the system 10 and represents an important inventive concept. Specifically, the depth range listed above allows the gaseous mixture 190 to diffuse through the pool 186 of molten $^{99}MoO_3$ and evolve therefrom in a rapid, efficient, and complete manner. Likewise, this specific procedure avoids the release of $^{99}MoO_3$ materials in particulate form which typically occurs in sublimation-based systems. The release of $^{99}MoO_3$ particles normally increases the level of Mo-based contamination in the $^{99m}Tc$ final product (discussed below). Accordingly, the melt-type process used in system 10 can result in a 10-fold reduction in the amount of molybdenum impurities in the completed $^{99m}Tc$ product compared with conventional sublimation procedures. Furthermore, the use of a pool 186 of molten $^{99}MoO_3$ at the depth range listed above provides the additional benefit of achieving more rapid cycle time to complete the separation process in the system 10. To form a pool 186 having a depth $Y_2$ of about 0.5–5 mm in a vessel 92 with the preferred size characteristics (ranges) listed above, about 1–200 g of the initial supply 36 of $^{99}MoO_3$ will typically be used as confirmed by routine preliminary experimentation.

In addition, the selection of a containment vessel 92 manufactured from the materials listed above (especially platinum) will ensure that the initial supply 36 of $^{99}MoO_3$ is evenly heated. The use of a containment vessel 92 made from the foregoing materials (particularly platinum) also prevents the vessel 92 from changing shape at the temperature levels encountered within the heating section 66. As a result, the bottom portion 96 of the vessel 92 will remain substantially flat, thereby ensuring that the depth $Y_2$ of the pool 186 of molten $^{99}MoO_3$ will remain uniform and consistent within the range listed above. A containment vessel 92 made of the previously discussed materials will likewise avoid breakage problems when any residual $^{99}MoO_3$ in the vessel 92 cools and expands during deactivation of the system 10.

The heating process described above is typically allowed to continue for a time period of about 0.1–2 hours, although the exact heating time will depend on the type of heating means 180 being employed and the amount of $^{99}MoO_3$ within the system 10. Immediately before or during initiation of the heating process, the oxidizing gas 120 (e.g. $O_{2(g)}$) is introduced into the reaction chamber 50 for combination with the gaseous mixture 190 in the heating section 66. In the embodiment of FIG. 1, the supply of oxidizing gas 120 is delivered from the storage container 122 through the gas flow conduit 124 using the pump 134. If the gas 120 is sufficiently pressurized as noted above, release of the gas 120 from the container 122 will cause it to spontaneously pass through the gas flow conduit 124 in a similar manner without using the pump 134. The gas 120 will then flow from the conduit 124 into the cylindrical gas delivery unit 132. Specifically, the gas 120 will enter the gas delivery unit 132 through the bore 164 (FIG. 1) and thereafter pass into the annular gas flow zone 146 surrounded by the side wall 140. As the gas 120 continues to enter the gas delivery unit 132, it will flow in the direction of arrows 192 and simultaneously pass over the outer surface 62 of the reaction chamber 50 at the first cooling section 74 in order to provide a temperature modulating effect (discussed further below). The gas 120 will then pass through the open region 156 between the end plate 154 and the first end 52 of the reaction chamber 50, followed by entry into the first end 52 in the direction of arrow 194. In a preferred embodiment designed to facilitate the separatory process, the gas 120 will flow into and through the reaction chamber 50 at a flow rate of about 10–100 std. cc/min which may be achieved by proper adjustment of the gas pump 134 or other conventional gas flow regulators (not shown). This rate is preferred because it yields an acceptably short residence time in connection with the evolved products in the system 10 without producing an unacceptably high carryover of molybdenum into the final product as discussed below. Likewise, this flow rate will be applicable in alternative variations of the system 10 which do not use the gas delivery unit 132 and instead directly introduce the gas 120 into the open first end 52 of the reaction chamber 50 as discussed above. However, the actual gas flow rate in a given situation will depend on a variety of factors including the size of the system 10, the materials being processed, and other considerations as determined by preliminary pilot tests. As noted above, delivery of the gas 120 may be undertaken immediately before or simultaneously with production of the supply 184 of molten $^{99}MoO_3$. In addition, the gas 120 is optimally delivered into the reaction chamber 50 at a temperature of about 700°–900° C. which is achieved prior to passage over the pool 186 of molten $^{99}MoO_3$ using the heating means 180 which surrounds the gas delivery unit 132 in cooperation with the heater 135 if necessary.

As the gas 120 (e.g. $O_{2(g)}$) passes into and through the heating section 66, it combines with the gaseous mixture 190 to form a gaseous stream 196 schematically illustrated in FIG. 1. During this process, the gas 120 oxidizes the vaporized $^{99m}TcO_3$ and vaporized $^{99m}TcO_2$ in the gaseous mixture 190 to form a supply of vaporized $^{99m}Tc_2O_7$ therefrom. As a result, the gaseous stream 196 at this stage will consist of the following materials in combination: (1) remaining (unreacted) amounts of the gas 120 (e.g. $O_{2(g)}$); (2) vaporized $^{99}MoO_3$; and (3) vaporized $^{99m}Tc_2O_7$. In a preferred embodiment, excess amounts of the gas 120 will be used in the system 10 above the amount necessary to perform an oxidizing function so that the gas 120 can also be used as a continuous carrier to move the various vaporized materials through the system 10. For this reason, excess amounts of unreacted gas 120 will, in most cases, be present in the gaseous stream 196. The gaseous stream 196 then passes out of the heating section 66 at approximately the same flow rate associated with the initial entry of the oxidizing gas 120 into the reaction chamber 50, and thereafter enters the first cooling section 74. As previously noted, the first cooling section 74 begins at position 70 and ends at position 72 illustrated in FIG. 1. Likewise, the first cooling section 74 represents the primary condensation stage of the multi-stage condensation system 10. The use of multiple stages to achieve fractional condensation as discussed further below represents a significant advance in the art of $^{99m}Tc$ separation technology which avoids the required use of filters and the like.

As the gaseous stream 196 enters the first cooling section 74, it is subjected to a gradual cooling process which is sufficient to remove (e.g. condense) the vaporized $^{99}MoO_3$ from the gaseous stream 196 while leaving the vaporized $^{99m}Tc_2O_7$ unaffected. This is accomplished by the formation of a specific negative temperature gradient which allows the selective removal of vaporized $^{99}MoO_3$ in a highly efficient and complete manner. When the gaseous stream 196 enters the first cooling section 74 (e.g. the primary condensation stage), it will have an initial temperature of about 800°–900° C. as it passes position 70 shown in FIG. 1. A gradual and progressive decrease in the temperature of the gaseous stream 196 will then take place in the first cooling section 74. Specifically, the gaseous stream 196 in the first cooling section 74 is cooled from the initial temperature of about 800°–900° C. at position 70 to a final temperature of about 300°–400° C. when the stream 196 exits the first cooling section 74 at position 72. Likewise, optimum results will be achieved if the temperature decrease associated with the gaseous stream 196 is undertaken at a cooling rate of about 5°–50° C./cm within the first cooling section 74. The term "cooling rate" as used herein shall involve the amount of cooling (in °C.) per unit length of the section under consideration. This is accomplished by the control of numerous factors including the length $L_2$ of the first cooling section 74 which (as noted above) is optimally about 1–100 cm, depending on the desired scale of the system 10. Also, the cooling rate in the first cooling section 74 may be controlled by the counter-current flow of gas 120 through the gas delivery unit 132 along the outer surface 62 of the reaction chamber 50. Cooling rates substantially greater than those described above may result in supersaturation of the vaporized $^{99}MoO_3$ which causes friable, thread-like $^{99}MoO_3$ crystals to form in the first cooling section 74. These crystals are easily transported downstream in the reaction chamber 50. As a result, purity levels in the final $^{99m}Tc$ product can be diminished.

The substantially complete condensation (removal) of vaporized $^{99}MoO_3$ from the gaseous stream 196 without premature condensation of the vaporized $^{99m}Tc_2O_7$ is accomplished within the first cooling section 74 by control of the following factors: (1) decreasing the temperature of the gaseous stream 196 from the initial value listed above to the desired final value; (2) the use of a first cooling section 74 having a length $L_2$ within the range described above; and (3) cooling of the gaseous stream 196 at the foregoing rate. All of these factors enable vaporized $^{99}MoO_3$ in the gaseous stream 196 to be condensed in a highly selective manner. As a result, adherent $^{99}MoO_3$ crystals 200 (FIG. 1) form on the inner surface 60 of the reaction chamber 50 in the first cooling section 74. It should be noted that the term "condensation" as used herein actually involves a process known as "desublimation" since the vaporized $^{99}MoO_3$ is directly converted from a gaseous form to solid crystals 200. Both of these terms shall therefore be deemed interchangeable and equivalent for the purposes of this invention.

In accordance with the foregoing process, efficient removal of the vaporized $^{99}MoO_3$ from the gaseous stream 196 is accomplished. Specifically, this procedure can remove about 99–100% of the vaporized $^{99}MoO_3$ from the gaseous stream 196 as it passes through the first cooling section 74. While the adjustment of various operating parameters within the system 10 may be needed to achieve optimum results, a representative first cooling section 74 will include the following operational characteristics: (1) initial temperature of the gaseous stream 196 at position 70 =800° C.; (2) final temperature of the gaseous stream 196 at position 72=350° C.; (3) flow rate of the gaseous stream 196 through the first cooling section 74=35 std. cc/min; (4)

cooling rate=20° C./cm.; (5) length $L_2$ of the first cooling section 74=25 cm; (6) diameter $D_2$ of the passageway 64 through the first cooling section 74=20 mm; (7) flow rate of the gas 120 as it passes along the outer surface 62 of the reaction chamber 50 at the first cooling section 74=35 std. cc/min; and (8) temperature of the gas 120 as it enters the gas delivery unit 132=20° C. However, the present invention shall not be limited to these values which are provided for example purposes.

As the gaseous stream 196 leaves the first cooling section 74 at position 72 (FIG. 1), it will contain the following compositions in combination: (1) remaining (unreacted) amounts of the oxidizing gas 120 (e.g. $O_{2(g)}$) as discussed above; and (2) vaporized $^{99m}Tc_2O_7$. Only minimal amounts of residual vaporized $^{99}MoO_3$ (if any at all) will remain since the foregoing process will remove about 99–100% of the vaporized $^{99}MoO_3$ from the gaseous stream 196 as discussed above. These amounts are sufficiently small to avoid substantial contamination of the final $^{99m}Tc$ product as described further below. The $^{99}MoO_3$ crystals 200 on the inner surface 60 of the first cooling section 74 are thereafter removed by physical means at desired intervals and may be reprocessed if desired. For example, in a preferred embodiment, the reaction chamber 50 (e.g. the heating section 66 and first cooling section 74) may be flooded with ammonium hydroxide ($NH_4OH$) in order to dissolve the residual $^{99}MoO_3$ within the system 10 (e.g. the $^{99}MoO_3$ crystals 200). The resulting solution is subsequently removed from the reaction chamber 50 and evaporated/calcined as desired to produce a powdered $^{99}MoO_3$ product. This product can then be hot-pressed into irradiation targets or reduced to elemental molybdenum in a stream of hydrogen. If elemental molybdenum is produced, it can be hot-pressed into a target in combination with a conventional organic binder. In this manner, the residual $^{100}MoO_3$ may be recycled and reused.

Next, the gaseous stream 196 enters the second cooling section 76 (e.g. the secondary condensation stage) of the reaction chamber 50 as it passes position 72 (FIG. 1). The gaseous stream 196 is then condensed (e.g. desublimated) within the second cooling section 76 to remove the vaporized $^{99m}Tc_2O_7$ from the stream 196. As the gaseous stream 196 enters the second cooling section 76, it will have a preferred and optimal starting temperature of about 300°–400° C. (which is substantially the same as the final temperature of the gaseous stream 196 when it left the first cooling section 74 as discussed above). The gaseous stream 196 is then cooled to an ending temperature of about 20°–80° C. as it passes through and leaves the second cooling section 76 (e.g. at the second end 54 of the reaction chamber 50). This temperature decrease will occur in a gradual and progressive manner in order to ensure maximum yields of the desired $^{99m}Tc$ product. Optimum results will be achieved if the temperature decrease associated with the gaseous stream 196 in the second cooling section 76 is undertaken at a cooling rate of about 4°–200° C./cm therein depending on the size and desired scale of the system 10 as determined by preliminary investigation. However, the cooling rate and other factors associated with the second cooling section 76 are not as critical as those associated with the first cooling section 74 since the first cooling section 74 is responsible for removing substantially all of the vaporized $^{99}MoO_3$ from the gaseous stream 196 (which is of primary importance in the system 10). It should also be noted that the flow rate associated with the gaseous stream 196 at this stage will remain constant at the values listed above. In this regard, the flow rate of the gaseous stream 196 through all parts of the reaction chamber 50 will, in a preferred embodiment, be the same (e.g. at about 10–100 std. cc/min as previously noted).

Cooling of the gaseous stream 196 within the second cooling section 76 is primarily accomplished by controlling the length $L_3$ of the second cooling section 76 as discussed above. In a preferred embodiment, the second cooling section 76 is cooled by direct contact with ambient air (which will have a temperature of about 20°–25° C. in typical processing environments.) The use of a sufficiently long second cooling section 76 will avoid the need for external cooling systems at this stage of the reaction process (e.g. water cooling units, chiller coils, etc.) However, conventional auxiliary cooling systems may be used if appropriate as determined by preliminary pilot tests involving many factors including the size of the system 10 being employed, as well as the environmental conditions associated with the process. In summary, the condensation and removal of vaporized $^{99m}Tc_2O_7$ from the gaseous stream 196 is accomplished within the second cooling section 76 by control of the following factors: (1) decreasing the temperature of the gaseous stream 196 from the starting value listed above to the designated ending value; (2) the use of a second cooling section 76 having a length $L_3$ within the above-described range; and (3) cooling of the gaseous stream 196 at the foregoing rate. All of these factors enable vaporized $^{99m}Tc_2O_7$ in the gaseous stream 196 to be condensed in a highly selective manner. As a result, a solid, adherent $^{99m}Tc_2O_7$ film 202 (FIG. 1) will form on the inner surface 60 of the reaction chamber 50 in the second cooling section 76. While formation of the $^{99m}Tc_2O_7$ film 202 will typically occur by condensation, other processes may also be taking place within the second cooling section 76 in connection with the formation of film 202. For example, one of these other processes may involve adsorption on the inner surfaces of the second cooling section 76. In this regard, the exact processes which take place within the second cooling section 76 are not completely known at the present time. However, since it is currently understood that condensation is the primary physical process which occurs within the second cooling section 76, the term "condensation" shall be used herein to collectively encompass all of the solidification and isolation processes associated with the $^{99m}Tc_2O_7$ film 202.

In accordance with the foregoing procedure, the efficient removal of vaporized $^{99m}Tc_2O_7$ from the gaseous stream 196 is accomplished. The claimed procedure can remove about 90–100% of the vaporized $^{99m}Tc_2O_7$ from the gaseous stream 196 as it passes through the second cooling section 76. While the adjustment of various operating parameters within the system 10 may be needed to achieve optimum results, a representative second cooling section 76 will include the following operational characteristics: (1) starting temperature of the gaseous stream 196 at position 72 upon entry into the second cooling section 76=350° C.; (2) ending temperature of the gaseous stream 196 at the end of the second cooling section 76 (e.g. at the second end 54 of the reaction chamber 50)=20° C.; (3) flow rate of the gaseous stream 196 through the second cooling section 76=35 std. cc/min; (4) cooling rate=15° C./cm.; (5) length $L_3$ of the second cooling section 76=20 cm; (6) diameter $D_3$ of the passageway 64 through the second cooling section 76=5 mm; and (7) temperature of the ambient air outside the second cooling section 76=20° C. However, the present invention shall not be limited to these values which are provided for example purposes.

The $^{99m}Tc_2O_7$ film 202 is then collected from the second cooling section 76 using a selected eluant solution as discussed below. To minimize the amount of eluant which is required for this purpose, the diameter $D_3$ of the passageway 64 through the second cooling section 76 is maintained at a minimal level, with preferred $D_3$ values being listed above (e.g. about 0.1–5 cm depending on the desired size and scale of the system 10). Larger $D_3$ values will typically result in a second cooling section 76 with a shorter overall length $L_3$. However, more eluant would then be needed to remove the $^{99m}Tc_2O_7$ film 202 from the system 10 which is undesirable from an economic and technical standpoint.

At this stage, the reaction process is substantially completed. The gaseous stream 196 leaving the open second end 54 of the reaction chamber 50 in the embodiment of FIG. 1 where the oxidizing gas 120 is used as a carrier will consist of substantially pure (+90%) residual (unreacted) oxidizing gas 120 (e.g. $O_{2(g)}$) with the balance of the stream 196 comprising various impurities and very small (inconsequential) levels of residual $^{99}$Mo and $^{99m}$Tc compounds. The final (remaining) oxygen-containing oxidizing gas 120 leaving the reaction chamber 50 at the second end 54 (e.g. designated at reference number 204 in FIG. 1) is then discarded or filtered in a conventional manner and reused as desired (especially if $O_{2(g)}$ is involved) by transferring the gas 204 back into the storage container 122 via conduit 206. The $^{99m}Tc_2O_7$ film 202 which remains within the second cooling section 76 represents and shall be characterized as a condensed $^{99m}$Tc-containing reaction product 208 which is the desired $^{99m}$Tc composition in this case. The $^{99m}$Tc-containing reaction product 208 is thereafter removed and further processed as desired, depending on the intended uses of the product 208 and other factors. The claimed method shall not be limited to any collection and treatment methods concerning the $^{99m}$Tc-containing reaction product 208. It should also be noted that the entire process described above typically takes only about 0.1–2 hours from start to finish depending on the scale of the system 10.

However, at this point, an additional discussion is warranted regarding the specific character of the $^{99m}$Tc-containing reaction product 208. As previously discussed, the "m" in the $^{99m}$Tc-containing reaction product 208 signifies the metastable excited state of the technetium isotope whose atomic weight is 99. This metastable state has the aforementioned half-life of six hours, and is a medically useful radioisotope of technetium. This is distinct from the ground state of the same isotope, $^{99}$Tc, which is also radioactive but whose half-life is about 213,000 years. The metastable state decays into the ground state, so $^{99}$Tc is always present to some degree in $^{99m}$Tc compositions, and increases with time. The two isomeric states of the same nucleus are impossible to distinguish chemically, and the $^{99}$Tc effectively competes with the $^{99m}$Tc in all known radiolabelling reactions. Thus, as a practical matter, suppliers of $^{99m}$Tc compositions always need to address how they will keep the amount of $^{99}$Tc contamination within acceptable levels through prompt handling and distribution.

In accordance with the claimed process, the next step involves collecting the $^{99m}$Tc-containing reaction product 208 (e.g. the $^{99m}Tc_2O_7$ film 202) from the second cooling section 76 of the reaction chamber 50. As noted above, many different methods may be used to accomplish this goal, with the present invention not being limited to a single collection technique. In a preferred embodiment, the flow of gas 120 into the reaction chamber 50 is discontinued, followed by the introduction of a selected eluant 210 into the passageway 64 at the second end 54 of the chamber 50 (e.g. at the second cooling section 76). A representative eluant 210 will consist of isotonic saline solution (e.g. 0.9% by weight NaCl).

While isotonic saline solution is preferred, other eluants which may be employed include HCl (followed by neutralization with NaOH) at about the same concentration levels. The amount of eluant 210 to be used will depend on the quantity of $^{99m}Tc_2O_7$ film 202 (e.g. $^{99m}$Tc-containing reaction product 208) which is present in the second cooling section 76. However, an amount should be used which is sufficient to dissolve all of the $^{99m}$Tc-containing reaction product 208 that is present in the second cooling section 76. In a representative embodiment involving a reaction chamber 50 having the broad dimension ranges listed above, about 0.01–2000 ml of eluant 210 will typically be used per mg of $^{99m}$Tc-containing reaction product 208, although this amount may be adjusted as necessary in accordance with routine preliminary experimentation. If 0.9% by weight saline solution is employed as the eluant 210, the foregoing process will typically result in a product concentration of greater than about 500 mCi $^{99m}$Tc/ml of eluant 210.

The eluant 210 is typically maintained at room temperature (e.g. about 20°–25° C.), and is allowed to remain in contact with the $^{99m}$Tc-containing reaction product 208 for a "soak" time of about 0.1–10 minutes (especially when a quartz reaction chamber 50 is involved). Using this process, at least about 90% or more of the $^{99m}$Tc-containing reaction product 208 (e.g. $^{99m}Tc_2O_7$ film 202) can be recovered from the system 10. As a result, a final $^{99m}$Tc-containing solution 212 (containing the dissolved $^{99m}Tc_2O_7$ film 202 in the form of an ionic solution of pertechnetate [$^{99m}TcO_4^-$] ions) is obtained as schematically illustrated in FIG. 1. The final $^{99m}$Tc-containing solution 212 can be temporarily stored prior to use, immediately used, or further processed. Additional processing steps may include supplemental purification using an alumina column to remove any residual molybdate ions that are carried over into the eluate as discussed further below. However, the amount of these materials (molybdate ions) will be very small (if not negligible) in view of the highly-efficient reaction procedure described above.

The $^{99m}$Tc-containing reaction product 208 has a high purity level. In 5 ml of the final $^{99m}$Tc-containing solution 212, the total $^{99}$Mo concentration is normally about 0.5–5 Ci/ml compared with a permissible $^{99}$Mo concentration in fission-produced $^{99m}$Tc products of about 150 Ci/ml. As a result, the final $^{99m}$Tc-containing solution 212 is sufficiently pure to be used for medical purposes without further treatment in accordance with currently-accepted standards, and will typically contain about 0.1–5 Ci of $^{99m}$Tc per ml. However, this value may vary depending on reaction conditions and the type of starting materials which are employed. If increased purity levels are desired in order to achieve a further reduction in the amount of $^{99}$Mo therein, the final $^{99m}$Tc-containing solution 212 can be passed through an alumina ($Al_2O_3$) column of conventional design (not shown) as noted above. Since each gram of alumina typically has a capacity to retain at least about 1000 micrograms of $^{99}$Mo/$^{100}$Mo, a very small column can be used to accomplish purification. Treatment in this manner can reduce the residual amount of $^{99}$Mo/$^{100}$Mo in the $^{99m}$Tc-containing solution 212 by a factor of at least about 80,000.

The present invention represents a substantial development in the production of $^{99m}$Tc compositions. The claimed method is characterized by numerous benefits compared with prior manufacturing processes (including fission-based production systems). These benefits include but are not limited to: (1) the ability to produce substantial $^{99m}$Tc yields without using reactor-based uranium processes; (2) the isolation of $^{99m}$Tc compositions from $^{99}$Mo products in a manner which avoids losses caused by incomplete separation of these materials; (3) generation of the desired $^{99m}Tc$ compositions using a procedure which is cost effective, rapid, safe, and avoids the production of hazardous, long-term nuclear wastes; (4) the use of a liquid-based, melt-type system which is characterized by improved product separation efficiency and purity levels compared with typical sublimation processes; (5) the development of a system which includes controlled, multiple condensation stages to provide a high product purity level with a minimal number of operational steps; (6) the use of a simplified production system that does not require supplemental vapor filtration components; and (7) the ability to manufacture desired $^{99m}Tc$ compositions using a minimal amount of equipment.

Having herein described preferred embodiments of the present invention, it is anticipated that suitable modifications may be made thereto by individuals skilled in the art which nonetheless remain within the scope of the invention. Depending on the type and desired capacity of the processing system, adjustments may be made to the specific operating parameters set forth above. The type of hardware to be used may also be varied as necessary. For example, the interior surfaces of the various sections of the reaction chamber 50 (especially the second cooling section 76) may be coated with additional materials (e.g. polytetrafluoroethylene [Teflon®]) to enhance the condensation/adsorption processes therein. Likewise, additional heating or cooling systems may be employed in connection with the first and second cooling sections 74, 76 as determined by routine experimental investigation to maintain the necessary temperature gradients and ensure maximum yields/purity levels. In this regard, the present invention shall only be construed in accordance with the following claims:

We claim:

1. A method for isolating and producing a $^{99m}Tc$-containing reaction product from a $^{99}Mo$ compound comprising:

providing an initial supply of $^{99}MoO_3$;

heating said initial supply of $^{99}MoO_3$ to a temperature sufficient to produce molten $^{99}MoO_3$ therefrom, said temperature further causing a gaseous mixture to evolve from said molten $^{99}MoO_3$, said gaseous mixture comprising vaporized $^{99}MoO_3$, vaporized $^{99m}TcO_3$, and vaporized $^{99m}TcO_2$;

forming said molten $^{99}MoO_3$ into a pool having a depth of about 0.5–5 mm, said depth allowing said gaseous mixture to diffuse through said molten $^{99}MoO_3$ and evolve therefrom in a rapid, efficient, and complete manner;

passing a supply of an oxygen-containing oxidizing gas over said pool of said molten $^{99}MoO_3$ during evolution of said gaseous mixture therefrom, said passing of said oxidizing gas over said molten $^{99}MoO_3$ producing a gaseous stream comprising said oxidizing gas in combination with said gaseous mixture, said oxidizing gas oxidizing said vaporized $^{99m}TcO_3$ and said vaporized $^{99m}TcO_2$ in said gaseous mixture to form a supply of vaporized $^{99m}Tc_2O_7$ therefrom, said gaseous stream comprising said vaporized $^{99m}Tc_2O_7$ and said vaporized $^{99}MoO_3$ therein after said oxidizing of said vaporized $^{99m}TcO_3$ and said vaporized $^{99m}TcO_2$;

cooling said gaseous stream in a primary condensation stage in an amount sufficient to condense and remove said vaporized $^{99}MoO_3$ from said gaseous stream while allowing said vaporized $^{99m}Tc_2O_7$ to remain unaffected;

cooling said gaseous stream in a secondary condensation stage after treatment in said primary condensation stage in an amount sufficient to condense and remove said vaporized $^{99m}Tc_2O_7$ from said gaseous stream so that a condensed $^{99m}Tc$-containing reaction product is produced from condensation of said vaporized $^{99m}Tc_2O_7$; and collecting said condensed $^{99m}Tc$-containing reaction product.

2. The method of claim 1 wherein said providing of said initial supply of $^{99}MoO_3$ comprises:

providing an electron accelerator apparatus and a supply of $^{100}MoO_3$;

activating said electron accelerator apparatus in order to generate high energy photons therein; and irradiating said $^{100}MoO_3$ with said high energy photons from said electron accelerator apparatus to produce said initial supply of $^{99}MoO_3$ from said $^{100}MoO_3$.

3. The method of claim 1 wherein said providing of said initial supply of $^{99}MoO_3$ comprises:

providing an electron accelerator apparatus and a supply of $^{100}Mo$ metal;

activating said electron accelerator apparatus in order to generate high energy photons therein;

irradiating said $^{100}Mo$ metal with said high energy photons from said electron accelerator apparatus to produce $^{99}Mo$ metal therefrom;

dissolving said $^{99}Mo$ metal in at least one oxygen-containing solvent to generate a solvated $^{99}Mo$ product; and drying said solvated $^{99}Mo$ product to produce a dried $^{99}Mo$ compound, said dried $^{99}Mo$ compound comprising said initial supply of $^{99}MoO_3$.

4. The method of claim 1 wherein said heating of said initial supply of $^{99}MoO_3$ to said temperature sufficient to produce said molten $^{99}MoO_3$ comprises heating said initial supply of $^{99}MoO_3$ to about 800°–900° C.

5. The method of claim 1 further comprising the step of heating said oxidizing gas to a temperature of about 700°–900° C. prior to said passing of said oxidizing gas over said pool of said molten $^{99}MoO_3$.

6. The method of claim 1 wherein said passing of said oxidizing gas over said pool of said molten $^{99}MoO_3$ comprises passing said oxidizing gas over said pool at a flow rate of about 10–100 std. cc/min.

7. The method of claim 1 wherein said cooling of said gaseous stream in said primary condensation stage comprises cooling said gaseous stream from an initial temperature of about 800°–900° C. when said gaseous stream enters said primary condensation stage to a final temperature of about 300°–400° C. when said gaseous stream exits said primary condensation stage in order to condense and remove said vaporized $^{99}MoO_3$ from said gaseous stream.

8. The method of claim 1 wherein said cooling of said gaseous stream in said secondary condensation stage comprises cooling said gaseous stream from a starting temperature of about 300°–400° C. when said gaseous stream enters said secondary condensation stage to an ending temperature of about 20°–80° C. when said gaseous stream exits said secondary condensation stage in order to condense and remove said vaporized $^{99m}Tc_2O_7$ from said gaseous stream.

9. A method for isolating and producing a $^{99m}Tc$-containing reaction product from a $^{99}Mo$ compound comprising the steps of:

providing an initial supply of $^{99}MoO_3$;

heating said initial supply of $^{99}MoO_3$ to a temperature of about 800°–900° C. which is sufficient to produce molten $^{99}MoO_3$ therefrom, said temperature further causing a gaseous mixture to evolve from said molten $^{99}MoO_3$, said gaseous mixture comprising vaporized $^{99}MoO_3$, vaporized $^{99m}TcO_3$, and vaporized $^{99m}O_2$;

passing a supply of an oxygen-containing oxidizing gas over said molten $^{99}MoO_3$ during evolution of said gaseous mixture therefrom, said passing of said oxidizing gas over said molten $^{99}MoO_3$ producing a gaseous stream comprising said oxidizing gas in combination with said gaseous mixture, said oxidizing gas oxidizing said vaporized $^{99m}TcO_3$ and said vaporized $^{99m}TcO_2$ in said gaseous mixture to form a supply of vaporized $^{99m}Tc_2O_7$ therefrom, said gaseous stream comprising said vaporized $^{99m}Tc_2O_7$ and said vaporized $^{99}MoO_3$ therein after said oxidizing of said vaporized $^{99m}TcO_3$ and said vaporized $^{99m}TcO_2$;

cooling said gaseous stream in a primary condensation stage from an initial temperature of about 800°–900° C. when said gaseous stream enters said primary condensation stage to a final temperature of about 300°–400° C. when said gaseous stream exits said primary condensation stage in order to condense and remove said vaporized $^{99}MoO_3$ from said gaseous stream while allowing said vaporized $^{99m}Tc_2O_7$ to remain unaffected;

cooling said gaseous stream in a secondary condensation stage after treatment in said primary condensation stage from a starting temperature of about 300°–400° C. when said gaseous stream enters said secondary condensation stage to an ending temperature of about 20°80° C. when said gaseous stream exits said secondary condensation stage in order to condense and remove said vaporized $^{99m}Tc_2O_7$ from said gaseous stream so that a condensed $^{99m}Tc$-containing reaction product is produced from condensation of said vaporized $^{99m}Tc_2O_7$; and collecting said condensed $^{99m}Tc$-containing reaction product.

10. A method for isolating and producing a $^{99m}Tc$-containing reaction product from a $^{99}Mo$ compound comprising:

providing an initial supply of $^{99}MoO_3$;

providing an elongate reaction chamber comprising a first end, a second end, a side wall, and a passageway through said reaction chamber from said first end to said second end, said reaction chamber further comprising a heating section beginning at said first end, heating means for applying heat to said heating section, a first cooling section in fluid communication with said heating section, and a second cooling section in fluid communication with said first cooling section, said second cooling section terminating at said second end of said reaction chamber with said first cooling section being positioned between said heating section and said second cooling section;

placing said initial supply of $^{99}MoO_3$ within said heating section in said reaction chamber;

heating said initial supply of $^{99}MoO_3$ within said heating section of said reaction chamber using said heating means so that said initial supply of $^{99}MoO_3$ is heated to a temperature sufficient to produce molten $^{99}MoO_3$ therefrom, said temperature further causing a gaseous mixture to evolve from said molten $^{99}MoO_3$, said gaseous mixture comprising vaporized $^{99}MoO_3$, vaporized $^{99m}TcO_3$, and vaporized $^{99m}TcO_2$;

forming said molten $^{99}MoO_3$ into a pool within said reaction chamber;

passing a supply of an oxygen-containing oxidizing gas over said pool of said molten $^{99}MoO_3$ during evolution of said gaseous mixture therefrom, said passing of said oxidizing gas over said molten $^{99}MoO_3$ producing a gaseous stream comprising said oxidizing gas in combination with said gaseous mixture, said oxidizing gas oxidizing said vaporized $^{99m}TcO_3$ and said vaporized $^{99m}TcO_2$ in said gaseous mixture to form a supply of vaporized $^{99m}Tc_2O_7$ therefrom, said gaseous stream comprising said vaporized $^{99m}Tc_2O_7$ and said vaporized $^{99}MoO_3$ therein after said oxidizing of said vaporized $^{99m}TcO_3$ and said vaporized $^{99m}TcO_2$, said gaseous stream passing through said heating section and entering into said first cooling section of said reaction chamber;

cooling said gaseous stream within said first cooling section of said reaction chamber in an amount sufficient to condense and remove said vaporized $^{99}MoO_3$ from said gaseous stream while allowing said vaporized $^{99m}Tc_2O_7$ therein to remain unaffected, said gaseous stream thereafter leaving said first cooling section and entering into said second cooling section of said reaction chamber;

cooling said gaseous stream within said second cooling section of said reaction chamber after treatment in said first cooling section in an amount sufficient to condense and remove said vaporized $^{99m}Tc_2O_7$ from said gaseous stream so that a condensed $^{99m}Tc$-containing reaction product is produced within said second cooling section; and collecting said condensed $^{99m}Tc$-containing reaction product from said second cooling section of said reaction chamber.

11. The method of claim 10 wherein said heating of said initial supply of $^{99}MoO_3$ to a temperature sufficient to produce said molten $^{99}MoO_3$ comprises heating said initial supply of $^{99}MoO_3$ to about 800°–900° C.

12. The method of claim 10 wherein said cooling of said gaseous stream in said first cooling section of said reaction chamber comprises cooling said gaseous stream from an initial temperature of about 800°–900° C. when said gaseous stream enters said first cooling section to a final temperature of about 300°–400° C. when said gaseous stream exits said first cooling section in order to condense and remove said vaporized $^{99}MoO_3$ from said gaseous stream.

13. The method of claim 10 wherein said cooling of said gaseous stream in said second cooling section of said reaction chamber comprises cooling said gaseous stream from a starting temperature of about 300°–400° C. when said gaseous stream enters said second cooling section to an ending temperature of about 20°–80° C. when said gaseous stream exits said second cooling section in order to condense and remove said vaporized $^{99m}Tc_2O_7$ from said gaseous stream.

14. The method of claim 10 wherein said forming of said molten $^{99}MoO_3$ into said pool within said reaction chamber comprises:

providing a containment vessel;

positioning said containment vessel in said heating section of said reaction chamber; and placing said initial supply of $^{99}MoO_3$ within said containment vessel in said heating section, said heating of said initial supply of $^{99}MoO_3$ being undertaken inside said containment vessel, with said molten $^{99}MoO_3$ being retained therein in order to form said pool of said molten $^{99}MoO_3$.

15. The method of claim 10 where said pool of said molten $^{100}MoO_3$ has a depth of about 0.5–5 mm, said depth allowing said gaseous mixture to diffuse through said molten $^{99}MoO_3$ and evolve therefrom in a rapid, efficient, and complete manner.

16. The method of claim 10 wherein said second cooling section of said reaction chamber is positioned at an angle of about 15°–165° relative to said first cooling section.

17. A method for isolating and producing a $^{99m}$Tc-containing reaction product from a $^{99}$Mo compound comprising:

providing an initial supply of $^{99}MoO_3$;

providing an elongate reaction chamber comprising a first end, a second end, a side wall, and a passageway through said reaction chamber from said first end to said second end, said reaction chamber further comprising a heating section beginning at said first end, heating means for applying heat to said heating section, a first cooling section in fluid communication with said heating section, and a second cooling section in fluid communication with said first cooling section, said second cooling section terminating at said second end of said reaction chamber with said first cooling section being positioned between said heating section and said second cooling section;

placing said initial supply of $^{99}MoO_3$ within said heating section in said reaction chamber;

heating said initial supply of $^{99}MoO_3$ within said heating section of said reaction chamber using said heating means so that said initial supply of $^{99}MoO_3$ is heated to a temperature sufficient to produce molten $^{99}MoO_3$ therefrom, said temperature further causing a gaseous mixture to evolve from said molten $^{99}MoO_3$, said gaseous mixture comprising vaporized $^{99}MoO_3$, vaporized $^{99m}TcO_3$, and vaporized $^{99m}TcO_2$;

forming said molten $^{99}MoO_3$ into a pool within said reaction chamber;

passing a supply of an oxygen-containing oxidizing gas over said pool of said molten $^{99}MoO_3$ during evolution of said gaseous mixture therefrom, said passing of said oxidizing gas over said molten $^{99}MoO_3$ producing a gaseous stream comprising said oxidizing gas in combination with said gaseous mixture, said oxidizing gas oxidizing said vaporized $^{99}TcO_3$ and said vaporized $^{99m}TcO_2$ in said gaseous mixture in order to form a supply of vaporized $^{99m}Tc_2O_7$ therefrom, said gaseous stream comprising said vaporized $^{99m}Tc_2O_7$ and said vaporized $^{99}MoO_3$ therein after said oxidizing of said vaporized $^{99m}TcO_3$ and said vaporized $^{99m}TcO_2$, said gaseous stream passing through said heating section and entering into said first cooling section;

cooling said gaseous stream within said first cooling section of said reaction chamber from an initial temperature of about 800°–900° C. when said gaseous stream enters said first cooling section to a final temperature of about 300°–400° C. when said gaseous stream exits said first cooling section in order to condense and remove said vaporized $^{99}MoO_3$ from said gaseous stream while allowing said vaporized $^{99m}Tc_2O_7$ therein to remain unaffected, said first cooling section of said reaction chamber having a length sufficient to achieve a cooling rate within said first cooling section of about 5°–50° C./cm, said gaseous stream thereafter leaving said first cooling section and entering into said second cooling section;

cooling said gaseous stream within said second cooling section of said reaction chamber after treatment in said first cooling section in an amount sufficient to condense and remove said vaporized $^{99m}Tc_2O_7$ from said gaseous stream so that a condensed $^{99m}$Tc-containing reaction product is produced within said second cooling section; and collecting said condensed $^{99m}$Tc-containing reaction product from said second cooling section of said reaction chamber.

18. The method of claim 17 wherein said heating of said initial supply of $^{99}MoO_3$ to a temperature sufficient to produce said molten $^{99}MoO_3$ comprises heating said initial supply of $^{99}MoO_3$ to about 800°–900° C.

19. The method of claim 17 wherein said cooling of said gaseous stream in said second cooling section of said reaction chamber comprises cooling said gaseous stream from a starting temperature of about 300°–400° C. when said gaseous stream enters said second cooling section to an ending temperature of about 20°–80° C. when said gaseous stream exits said second cooling section in order to condense and remove said vaporized $^{99m}Tc_2O_7$ from said gaseous stream.

20. The method of claim 17 wherein said forming of said molten $^{99}MoO_3$ into said pool within said reaction chamber comprises:

providing a containment vessel;

positioning said containment vessel in said heating section of said reaction chamber; and placing said initial supply of $^{99}MoO_3$ within said containment vessel in said heating section, said heating of said initial supply of $^{99}MoO_3$ being undertaken inside said containment vessel, with said molten $^{99}MoO_3$ being retained therein in order to form said pool of said molten $^{99}MoO_3$.

21. The method of claim 17 wherein said pool of said molten $^{99}MoO_3$ has a depth of about 0.5–5 mm, said depth allowing said gaseous mixture to diffuse through said molten $^{99}MoO_3$ and evolve therefrom in a rapid, efficient, and complete manner.

22. The method of claim 17 wherein said second cooling section of said reaction chamber is positioned at an angle of about 15°–165° relative to said first cooling section.

23. A method for isolating and producing a $^{99m}$Tc-containing reaction product from a $^{99}$Mo compound comprising:

providing an electron accelerator apparatus and a supply of $^{100}MoO_3$;

activating said electron accelerator apparatus in order to generate high energy photons therein;

irradiating said $^{100}MoO_3$ with said high energy photons from said electron accelerator apparatus to produce an initial supply of $^{99}MoO_3$ from said $^{100}MoO_3$;

heating said initial supply of $^{99}MoO_3$ to a temperature sufficient to produce molten $^{99}MoO_3$ therefrom, said temperature further causing a gaseous mixture to evolve from said molten $^{99}MoO_3$, said gaseous mixture comprising vaporized $^{99}MoO_3$, vaporized $^{99m}TcO_3$, and vaporized $^{99m}TcO_2$;

forming said molten $^{99}MoO_3$ into a pool;

passing a supply of an oxygen-containing oxidizing gas over said pool of said molten $^{99}MoO_3$ during evolution of said gaseous mixture therefrom, said passing of said oxidizing gas over said molten $^{99}MoO_3$ producing a gaseous stream comprising said oxidizing gas in combination with said gaseous mixture, said oxidizing gas oxidizing said vaporized $^{99m}TcO_3$ and said vaporized $^{99m}TcO_2$ in said gaseous mixture to form a supply of vaporized $^{99m}Tc_2O_7$ therefrom, said gaseous stream comprising said vaporized $^{99m}Tc_2O_7$ and said vaporized $^{99}MoO_3$ therein after said oxidizing of said vaporized $^{99m}TcO_3$ and said vaporized $^{99m}TcO_2$;

cooling said gaseous stream in a primary condensation stage in an amount sufficient to condense and remove said vaporized $^{99}MoO_3$ from said gaseous stream while allowing said vaporized $^{99m}Tc_2O_7$ to remain unaffected;

cooling said gaseous stream in a secondary condensation stage after treatment in said primary condensation stage in an amount sufficient to condense and remove said vaporized $^{99m}Tc_2O_7$ from said gaseous stream so that a condensed $^{99m}Tc$-containing reaction product is produced from condensation of said vaporized $^{99m}Tc_2O_7$; and collecting said condensed $^{99m}Tc$-containing reaction product.

24. The method of claim 23 wherein said pool of said molten $^{99}MoO_3$ has a depth of about 0.5–5 mm, said depth allowing said gaseous mixture to diffuse through said molten $^{99}MoO_3$ and evolve therefrom in a rapid, efficient, and complete manner.

25. The method of claim 23 wherein said oxidizing gas comprises $O_{2(g)}$.

26. A method for isolating and producing a $^{99m}Tc$-containing reaction product from a $^{99}Mo$ compound comprising:

providing an electron accelerator apparatus and a supply of $^{100}Mo$ metal;

activating said electron accelerator apparatus in order to generate high energy photons therein;

irradiating said $^{100}Mo$ metal with said high energy photons from said electron accelerator apparatus to produce $^{99}Mo$ metal therefrom;

dissolving said $^{99}Mo$ metal in at least one oxygen-containing solvent to generate a solvated $^{99}Mo$ product;

drying said solvated $^{99}Mo$ product to produce a dried $^{99}Mo$ compound, said dried $^{99}Mo$ compound comprising an initial supply of $^{99}MoO_3$;

heating said initial supply of $^{99}MoO_3$ to a temperature sufficient to produce molten $^{99}MoO_3$ therefrom, said temperature further causing a gaseous mixture to evolve from said molten $^{99}MoO_3$, said gaseous mixture comprising vaporized $^{99}MoO_3$, vaporized $^{99m}TcO_3$, and vaporized $^{99m}TcO_2$;

forming said molten $^{99}MoO_3$ into a pool;

passing a supply of an oxygen-containing oxidizing gas over said pool of said molten $^{99}MoO_3$ during evolution of said gaseous mixture therefrom, said passing of said oxidizing gas over said molten $^{99}MoO_3$ producing a gaseous stream comprising said oxidizing gas in combination with said gaseous mixture, said oxidizing gas oxidizing said vaporized $^{99m}TcO_3$ and said vaporized $^{99m}TcO_2$ in said gaseous mixture to form a supply of vaporized $^{99m}Tc_2O_7$ therefrom, said gaseous stream comprising said vaporized $^{99m}Tc_2O_7$ and said vaporized $^{99}MoO_3$ therein after said oxidizing of said vaporized $^{99m}TcO_3$ and said vaporized $^{99m}TcO_2$;

cooling said gaseous stream in a primary condensation stage in an amount sufficient to condense and remove said vaporized $^{99}MoO_3$ from said gaseous stream while allowing said vaporized $^{99m}Tc_2O_7$ to remain unaffected;

cooling said gaseous stream in a secondary condensation stage after treatment in said primary condensation stage in an amount sufficient to condense and remove said vaporized $^{99m}Tc_2O_7$ from said gaseous stream so that a condensed $^{99m}Tc$-containing reaction product is produced from condensation of said vaporized $^{99m}Tc_2O_7$; and collecting said condensed $^{99m}Tc$-containing reaction product.

27. The method of claim 26 wherein said pool of said molten $^{99}MoO_3$ has a depth of about 0.5–5 mm, said depth allowing said gaseous mixture to diffuse through said molten $^{99}MoO_3$ and evolve therefrom in a rapid, efficient, and complete manner.

28. The method of claim 26 wherein said oxidizing gas comprises $O_{2(g)}$.

29. A method for isolating and producing a $^{99m}Tc$-containing reaction product from a $^{99}Mo$ compound comprising:

providing an initial supply of $^{99}MoO_3$;

providing an elongate reaction chamber comprising a first end, a second end, a side wall, and a passageway through said reaction chamber from said first end to said second end, said reaction chamber further comprising a heating section beginning at said first end, heating means for applying heat to said heating section, a first cooling section in fluid communication with said heating section, and a second cooling section in fluid communication with said first cooling section, said second cooling section being positioned at an angle of about 15°–165° relative to said first cooling section, said second cooling section terminating at said second end of said reaction chamber with said first cooling section being positioned between said heating section and said second cooling section, said passageway further comprising a containment vessel therein, said containment vessel being positioned within said heating section;

placing said initial supply of $^{99}MoO_3$ within said containment vessel in said reaction chamber;

heating said initial supply of $^{99}MoO_3$ within said containment vessel in said heating section of said reaction chamber using said heating means so that said initial supply of $^{99}MoO_3$ is heated to a temperature of about 800°–900° C. which is sufficient to produce molten $^{99}MoO_3$ therefrom, said molten $^{99}MoO_3$ being retained within said containment vessel in order to form a pool of said molten $^{99}MoO_3$ in said containment vessel, said temperature further causing a gaseous mixture to evolve from said molten $^{99}MoO_3$, said gaseous mixture comprising vaporized $^{99}MoO_3$, vaporized $^{99m}TcO_3$, and vaporized $^{99m}TcO_2$, said pool having a depth of about 0.5–5 mm, said depth allowing said gaseous mixture to diffuse through said molten $^{99}MoO_3$ and evolve therefrom in a rapid, efficient, and complete manner;

providing an oxidizing gas comprising $O_{2(g)}$;

passing said oxidizing gas over said pool of said molten $^{99}MoO_3$ at a flow rate of about 10–100 std. cc/min during evolution of said gaseous mixture therefrom, said passing of said oxidizing gas over said molten $^{99}MoO_3$ forming a gaseous stream comprising said oxidizing gas in combination with said gaseous mixture, said oxidizing gas oxidizing said vaporized $^{99m}TcO_3$ and said vaporized $^{99m}TcO_2$ in said gaseous mixture to form a supply of vaporized $^{99m}Tc_2O_7$ therefrom, said gaseous stream comprising said vaporized $^{99m}Tc_2O_7$ and said vaporized $^{99}MoO_3$ therein after said oxidizing of said vaporized $^{99m}TcO_3$ and said vaporized $^{99m}TcO_2$, said gaseous stream passing through said heating section and entering into said first cooling section of said reaction chamber;

cooling said gaseous stream within said first cooling section of said reaction chamber from an initial temperature of about 800°–900° C. when said gaseous stream enters said first cooling section to a final temperature of about 300°–400° C. when said gaseous stream exits said first cooling section in order to condense and remove said vaporized $^{99}MoO_3$ from said gaseous stream while allowing said vaporized $^{99m}Tc_2O_7$ therein to remain unaffected, said first cooling section of said reaction chamber having a length sufficient to achieve a cooling rate within said first cooling section of about 5°–50° C./cm, said gaseous stream thereafter leaving said first cooling section and entering into said second cooling section;

cooling said gaseous stream within said second cooling section of said reaction chamber after treatment within said first cooling section from a starting temperature of about 300°–400° C. when said gaseous stream enters said second cooling section to an ending temperature of about 20°–80° C. when said gaseous stream exits said second cooling section in order to condense and remove said vaporized $^{99m}Tc_2O_7$ from said gaseous stream so that a condensed $^{99m}$Tc-containing reaction product is produced within said second cooling section of said reaction chamber; and collecting said condensed $^{99m}$Tc-containing reaction product from said second cooling section of said reaction chamber.

* * * * *